United States Patent
Takeda et al.

(10) Patent No.: US 11,877,292 B2
(45) Date of Patent: Jan. 16, 2024

(54) TECHNIQUES FOR ACTIVATING AND RELEASING RESOURCES ACROSS MULTIPLE COMPONENT CARRIERS

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Wanshi Chen, San Diego, CA (US); Xiaoxia Zhang, San Diego, CA (US); Tao Luo, San Diego, CA (US); Mostafa Khoshnevisan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/377,185

(22) Filed: Jul. 15, 2021

(65) Prior Publication Data
US 2022/0039071 A1 Feb. 3, 2022

Related U.S. Application Data

(60) Provisional application No. 63/058,470, filed on Jul. 29, 2020.

(51) Int. Cl.
*H04W 72/23* (2023.01)
(52) U.S. Cl.
CPC .................................. *H04W 72/23* (2023.01)
(58) Field of Classification Search
CPC ....... H04L 5/001; H04L 5/0096; H04W 72/23
See application file for complete search history.

(56) References Cited

U.S. PATENT DOCUMENTS

2016/0227523 A1 8/2016 Desai et al.
2017/0223671 A1 8/2017 He et al.
(Continued)

OTHER PUBLICATIONS

Huawei, et al., "PDCCH Enhancement in Rel-11 Carrier Aggregation", 3GPP Draft, 3GPP TSG RAN WG1 Meeting #66, R1-112461, 3rd Generation Partnership Project (3GPP), Mobile Competence Centre, 650, Route Des Lucioles, F-06921, Sophia-Antipolis Cedex, France, vol. RAN WG1, No. Athens, Greece, Aug. 22-26, 2011, Aug. 16, 2011 (Aug. 16, 2011), XP050537553, 2 pages, [retrieved on Aug. 16, 2011] section 2.1, p. 1-p. 2.
(Continued)

*Primary Examiner* — Chi Ho A Lee
(74) *Attorney, Agent, or Firm* — Holland & Hart LLP

(57) ABSTRACT

Methods, systems, and devices for wireless communications are described. A user equipment (UE) may identify a resource configuration for communications with a base station on a multiple sets of resources across multiple component carriers, the resource configuration including at least a first set of resources on a first component carrier and a second set of resources on a second component carrier. The UE may receive, from the base station, a downlink control information (DCI) message on the first component carrier, the DCI message including a DCI format that controls the multiple of sets of resources across the plurality of component carriers. The UE may determine that the first set of resources and the second set of resources are one of activated or released based on a first indication in the DCI message.

28 Claims, 17 Drawing Sheets

(56) References Cited

U.S. PATENT DOCUMENTS

| | | | |
|---|---|---|---|
| 2018/0212717 A1* | 7/2018 | Yang | H04L 1/1812 |
| 2019/0281612 A1* | 9/2019 | Ma | H04W 72/23 |
| 2020/0163061 A1* | 5/2020 | Tang | H04W 72/23 |
| 2020/0275474 A1* | 8/2020 | Chen | H04L 1/1812 |
| 2020/0288449 A1* | 9/2020 | Shen | H04L 27/26 |
| 2021/0021382 A1* | 1/2021 | Chien | H04W 72/23 |
| 2021/0120572 A1* | 4/2021 | Chen | H04W 72/53 |
| 2021/0289536 A1* | 9/2021 | Liu | H04W 74/0841 |
| 2021/0314953 A1* | 10/2021 | Park | H04W 76/11 |
| 2022/0070855 A1* | 3/2022 | Zhang | H04W 72/51 |

OTHER PUBLICATIONS

International Search Report and Written Opinion—PCT/US2021/042030—ISA/EPO—dated Nov. 25, 2021.

* cited by examiner

TECHNIQUES FOR ACTIVATING AND RELEASING RESOURCES ACROSS MULTIPLE COMPONENT CARRIERS

CROSS REFERENCE

The present Application for Patent claims the benefit of U.S. Provisional Patent Application No. 63/058,470 by TAKEDA et al., entitled "TECHNIQUES FOR ACTIVATING AND RELEASING RESOURCES ACROSS MULTIPLE COMPONENT CARRIERS," filed Jul. 29, 2020, assigned to the assignee hereof, and expressly incorporated by reference herein.

FIELD OF TECHNOLOGY

The present disclosure relates to wireless communications, including techniques for activating and releasing resources across multiple component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, sets of communication resources (e.g., semi-persistent scheduling (SPS) grants for downlink resources, configured grants (CGs) for uplink resources) may be scheduled via downlink control information (DCI) messages. In some cases, the network may activate resources associated with an SPS grant and/or CG grant after the sets of resources have been indicated to the UE, thereby indicating that the UE may utilize the activated resources. Conversely, the network may require resources associated with an SPS grant and/or CG after the sets of resources have been indicated to the UE. In such cases, the base station may release (e.g., revoke or otherwise indicate as unavailable) sets of resources associated with a given SPS grant and/or CG via DCI signaling. However, limitations in the ability of DCI messages to activate and/or release multiple sets of resources across multiple component carriers may lead to increased control signaling overhead within the wireless communications system.

SUMMARY

The described techniques relate to improved methods, systems, devices, and apparatuses that support techniques for activating and releasing resources across multiple component carriers. Generally, the described techniques provide for activating and releasing multiple sets of communication resources (e.g., semi-persistent scheduling (SPS) grants for downlink, configured grants (CGs) for uplink) via a single downlink control information (DCI) message. In some aspects, a single DCI message may be used to activate and/or release multiple sets of resources across multiple component carriers. In some aspects, DCI messages with formats configured to schedule sets of resources across multiple component carriers may be used to activate and/or release sets of resources across multiple component carriers. The UE may determine whether a DCI message is configured to activate or release sets of resources across multiple component carriers (as opposed to scheduling) based on a new data indicator (NDI) field in the DCI message. Additionally, the UE may determine whether the DCI message is configured for activation or release of resources across multiple component carriers based on fields or values indicated in the DCI message, including redundancy version (RV), modulation and coding scheme (MCS), frequency domain resource assignment (FDRA) field values, or any combination thereof. Upon determining whether the DCI message is configured for activation or for release, the UE may identify the sets of resources which are to be activated or released based on indications of associations or mappings between component carriers and sets of resources in the DCI message. The UE may be configured to interpret the indications in the DCI message via radio resource control (RRC) signaling. Subsequently, the UE may activate or release the SPS and/or CG resources, across the multiple component carriers that correspond to the received indication.

A method of wireless communication at a UE is described. The method may include identifying a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, receiving, from the base station, a DCI message on the first component carrier, the DCI message including a DCI format that controls the set of sets of resources across the set of component carriers, and determining that the first set of resources and the second set of resources are one of activated or released based on a first indication in the DCI message.

An apparatus for wireless communication at a UE is described. The apparatus may include a processor, memory coupled with the processor, and instructions stored in the memory. The instructions may be executable by the processor to cause the apparatus to identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, receive, from the base station, a DCI message on the first component carrier, the DCI message including a DCI format that controls the set of sets of resources across the set of component carriers, and determine that the first set of resources and the second set of resources are one of activated or released based on a first indication in the DCI message.

Another apparatus for wireless communication at a UE is described. The apparatus may include means for identifying a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, receiving, from the base station, a DCI message on the first component carrier, the DCI message including a DCI format that controls the set of sets of resources across the set of component carriers, and determining that the first set of resources and the second set of resources are one of activated or released based on a first indication in the DCI message.

A non-transitory computer-readable medium storing code for wireless communication at a UE is described. The code may include instructions executable by a processor to identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, receive, from the base station, a DCI message on the first component carrier, the DCI message including a DCI format that controls the set of sets of resources across the set of component carriers, and determine that the first set of resources and the second set of resources are one of activated or released based on a first indication in the DCI message.

In some examples of the method, apparatuses, and non-transitory computer-readable medium described herein, the first indication includes an RV field, an MCS field, an FDRA field, or any combination thereof.

In some examples of the method, apparatuses, and non-transitory computer-readable medium described herein, the first indication includes a combination of the RV field, the MCS field, and the FDRA field.

Some examples of the method, apparatuses, and non-transitory computer-readable medium described herein may further include operations, features, means, or instructions for receiving a first NDI field of the DCI message, where determining that the first set of resources may be the one of activated or released may be based on a value of the first NDI field.

In some examples of the method, apparatuses, and non-transitory computer-readable medium described herein, the first NDI field of the DCI message may be associated with the first component carrier and the second component carrier, and determining that the second set of resources may be the one of activated or released may be based on the value of the first NDI field.

Some examples of the method, apparatuses, and non-transitory computer-readable medium described herein may further include operations, features, means, or instructions for receiving a second NDI field of the DCI message, where the first NDI field of the DCI message may be associated with the first component carrier, the second NDI field of the DCI message may be associated with the second component carrier, and determining that the second set of resources may be one of activated or released may be based on a value of the second NDI field.

In some examples of the method, apparatuses, and non-transitory computer-readable medium described herein, determining that the first set of resources and the second set of resources may be one of activated or released further may include operations, features, means, or instructions for determining whether a first RV field of the received DCI message includes a first value associated with activation or release of the set of sets of resources or a second value associated with scheduling of the set of sets of resources.

Some examples of the method, apparatuses, and non-transitory computer-readable medium described herein may further include operations, features, means, or instructions for receiving, from the base station, a configuration for the UE to use to interpret the DCI message, where determining that the first set of resources and the second set of resources may be one of activated or released may be based on the received configuration.

Some examples of the method, apparatuses, and non-transitory computer-readable medium described herein may further include operations, features, means, or instructions for identifying a second indication in the DCI message, and determining that the DCI message may be configurable to activate the set of sets of resources based on the second indication and the configuration for the UE to use to interpret the DCI message.

In some examples of the method, apparatuses, and non-transitory computer-readable medium described herein, the second indication in the DCI message includes a value of a carrier indicator field.

Some examples of the method, apparatuses, and non-transitory computer-readable medium described herein may further include operations, features, means, or instructions for determining that the DCI message may be configured to activate the set of sets of resources based on a control resource set (CORESET), a search space, or both, on which the DCI message was received.

Some examples of the method, apparatuses, and non-transitory computer-readable medium described herein may further include operations, features, means, or instructions for determining that the DCI message controls the set of sets of resources based on determining that at least a portion of the DCI message may be scrambled according to a configured scheduling radio network temporary identifier (CS-RNTI), where determining that the first set of resources and the second set of resources may be one of activated or released may be based on determining that at least a portion of the DCI message may be scrambled according to the CS-RNTI.

Some examples of the method, apparatuses, and non-transitory computer-readable medium described herein may further include operations, features, means, or instructions for transmitting, to the base station, a UE capability message indicating that the UE may be configured to release two or more sets of resources via a single DCI message, where receiving the DCI message may be based on transmitting the UE capability message.

In some examples of the method, apparatuses, and non-transitory computer-readable medium described herein, the first set of resources and the second set of resources include a set of downlink resources associated with an SPS grant, a set of uplink resources associated with a CG, or a combination thereof.

In some examples of the method, apparatuses, and non-transitory computer-readable medium described herein, the DCI format of the received DCI message may be configurable by the base station to perform one of scheduling, activating, or releasing resources on the set of component carriers.

A method of wireless communication at a base station is described. The method may include identifying a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, determining that the first set of resources and the second set of resources are to be one of activated or released, and transmitting, to the UE on the first component carrier, a DCI message that includes a first indication indicating that the first set of resources and the second set of resources are to be the one of activated or released, the DCI message including a DCI format that controls the set of sets of resources across the set of component carriers.

An apparatus for wireless communication at a base station is described. The apparatus may include a processor, memory coupled with the processor, and instructions stored in the memory. The instructions may be executable by the processor to cause the apparatus to identify a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, determine that the first set of resources and the second set of resources are to be one of activated or released, and transmit, to the UE on the first component carrier, a DCI message that includes a first indication indicating that the first set of resources and the second set of resources are to be the one of activated or released, the DCI message including a DCI format that controls the set of sets of resources across the set of component carriers.

Another apparatus for wireless communication at a base station is described. The apparatus may include means for identifying a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, determining that the first set of resources and the second set of resources are to be one of activated or released, and transmitting, to the UE on the first component carrier, a DCI message that includes a first indication indicating that the first set of resources and the second set of resources are to be the one of activated or released, the DCI message including a DCI format that controls the set of sets of resources across the set of component carriers.

A non-transitory computer-readable medium storing code for wireless communication at a base station is described. The code may include instructions executable by a processor to identify a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, determine that the first set of resources and the second set of resources are to be one of activated or released, and transmit, to the UE on the first component carrier, a DCI message that includes a first indication indicating that the first set of resources and the second set of resources are to be the one of activated or released, the DCI message including a DCI format that controls the set of sets of resources across the set of component carriers.

In some examples of the method, apparatuses, and non-transitory computer-readable medium described herein, the first indication includes an RV field, an MCS field, an FDRA field, or any combination thereof.

In some examples of the method, apparatuses, and non-transitory computer-readable medium described herein, the first indication includes a combination of the RV field, the MCS field, and the FDRA field.

Some examples of the method, apparatuses, and non-transitory computer-readable medium described herein may further include operations, features, means, or instructions for transmitting a first NDI field of the DCI message, where the DCI message indicates that the first set of resources may be the one of activated or released based on a value of the first NDI field.

In some examples of the method, apparatuses, and non-transitory computer-readable medium described herein, the first NDI field of the DCI message may be associated with the first component carrier and the second component carrier, and the DCI message indicates that the second set of resources may be the one of activated or released based on the value of the first NDI field.

Some examples of the method, apparatuses, and non-transitory computer-readable medium described herein may further include operations, features, means, or instructions for transmitting a second NDI field of the DCI message, where the first NDI field of the DCI message may be associated with the first component carrier, the second NDI field of the DCI message may be associated with the second component carrier, and the DCI message indicates that the second set of resources may be the one of activated or released based on the value of the second NDI field.

In some examples of the method, apparatuses, and non-transitory computer-readable medium described herein, the DCI message indicates that the second set of resources may be the one of activated or released further based on a first value of a first RV field of the transmitted DCI message, the first value of the first RV field associated with activation or release of the set of sets of resources, and a second value of the first RV field associated with scheduling of the set of sets of resources.

Some examples of the method, apparatuses, and non-transitory computer-readable medium described herein may further include operations, features, means, or instructions for transmitting, to the UE, a configuration for the UE to use to interpret the DCI message, where determining that the first set of resources and the second set of resources may be one of activated or released may be based on the transmitted configuration.

Some examples of the method, apparatuses, and non-transitory computer-readable medium described herein may further include operations, features, means, or instructions for transmitting, to the UE, a second indication in the DCI message, and determining that the DCI message may be configurable to activate the set of sets of resources based on the second indication and the configuration for the UE to use to interpret the DCI message.

In some examples of the method, apparatuses, and non-transitory computer-readable medium described herein, the second indication in the DCI message includes a value of a carrier indicator field.

Some examples of the method, apparatuses, and non-transitory computer-readable medium described herein may further include operations, features, means, or instructions for determining that the DCI message may be configured to activate the set of sets of resources based on a CORESET, a search space, or both, on which the DCI message was transmitted.

Some examples of the method, apparatuses, and non-transitory computer-readable medium described herein may further include operations, features, means, or instructions for encoding, according to a CS-RNTI, at least a portion of the DCI message to indicate that the first set of resources and the second set of resources may be to be the one of activated or released.

Some examples of the method, apparatuses, and non-transitory computer-readable medium described herein may further include operations, features, means, or instructions for receiving, from the UE, a UE capability message indicating that the UE may be configured to release two or more sets of resources via a single DCI message, where transmitting the DCI message may be based on receiving the UE capability message.

In some examples of the method, apparatuses, and non-transitory computer-readable medium described herein, the first set of resources and the second set of resources include a set of downlink resources associated with an SPS grant, a set of uplink resources associated with a CG, or a combination thereof.

In some examples of the method, apparatuses, and non-transitory computer-readable medium described herein, the DCI format of the received DCI message may be configurable by the base station to perform one of scheduling, activating, or releasing resources on the set of component carriers.

DETAILED DESCRIPTION

Figure 1:
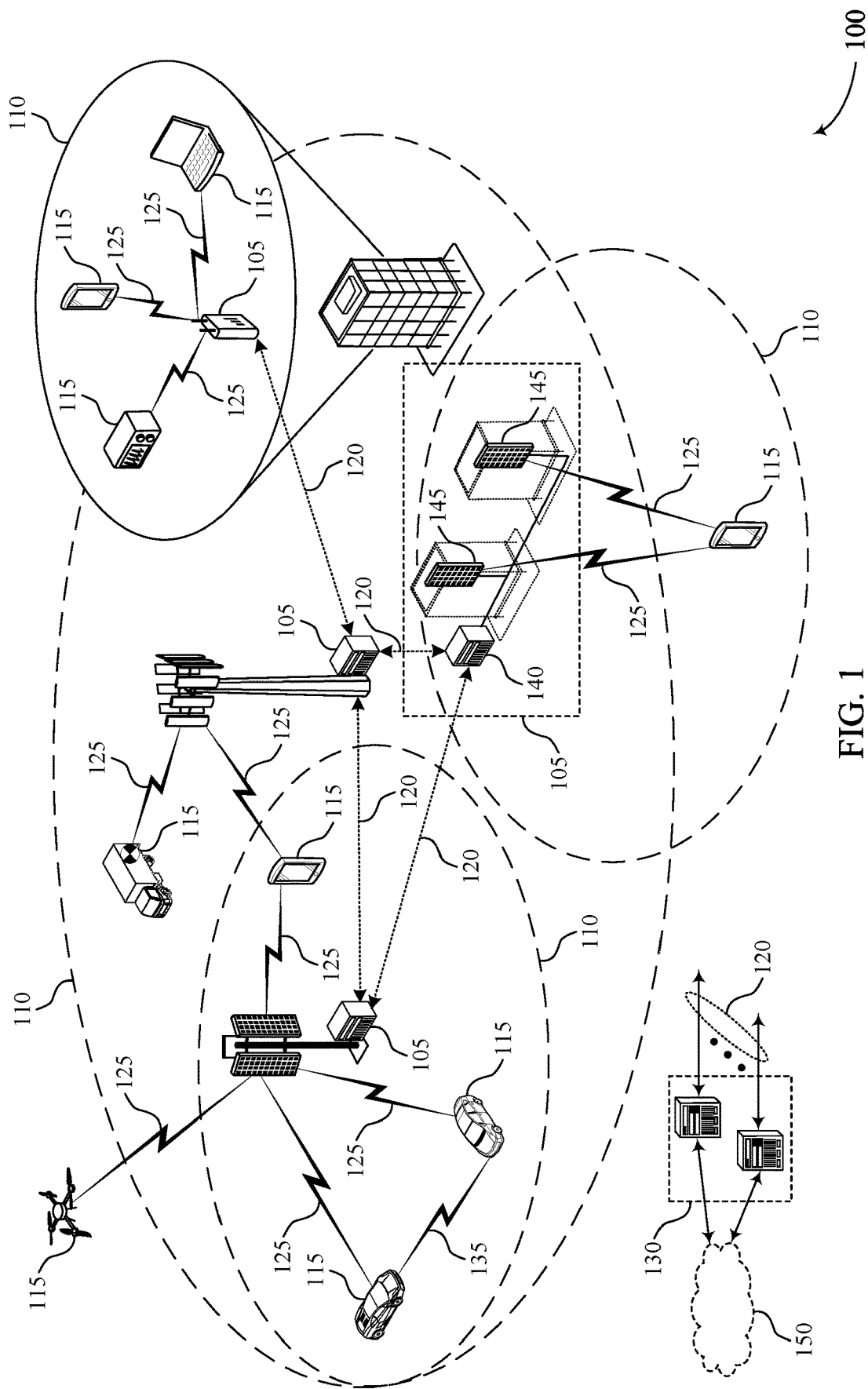
FIG. 1 illustrates an example of a wireless communications system that supports techniques for activating and releasing resources across multiple component carriers in accordance with aspects of the present disclosure.

In some wireless communications systems, sets of communication resources may be scheduled via downlink control information (DCI). For example, DCI messages may be used to signal semi-persistent scheduling (SPS) grants that schedule resources for downlink transmissions from the base station to the UE. DCI messages may also be used to signal configured grants (CGs) that schedule resources for uplink transmissions from the UE to the base station. Also, a UE may be configured to communicate on multiple component carriers, and multiple SPS and/or CG resources may be scheduled across these multiple component carriers. In some cases, the network may activate resources associated with an SPS grant and/or CG grant after the sets of resources have been indicated to the UE, thereby indicating that the UE may utilize the activated resources. Conversely, the network may require resources associated with an SPS grant and/or CG after the sets of resources have been indicated to the UE. In such cases, the base station may release (e.g., revoke or otherwise indicate as unavailable) sets of resources associated with a given SPS grant and/or CG via DCI signaling. According to current techniques, only a single set of resources may be activated per DCI message. Current techniques also do not allow sets of resources on multiple component carriers to be released via a single DCI message. These limitations associated with activating and releasing sets of resources may lead to increased control signaling overhead within the wireless communications system.

To address issues associated with activating and releasing sets of resources at a UE (e.g., to decrease control signaling overhead), techniques for activating and releasing multiple SPS and/or CG resources via a single DCI message are disclosed. In some aspects, a single DCI message may be used to activate or release multiple sets of resources across multiple component carriers. In some aspects, DCI messages with formats configured to schedule sets of resources across multiple component carriers may be used to activate and/or release sets of resources across multiple component carriers. The UE may determine whether a DCI message is configured to activate or release sets of resource across multiple component carriers (as opposed to scheduling) based on a new data indicator (NDI) field in the DCI message. Additionally, the UE may determine whether the DCI message is configured for activation or release of resources across multiple component carriers based on fields or values indicated in the DCI message, including redundancy version (RV), modulation and coding scheme (MCS), frequency domain resource assignment (FDRA) field values, or any combination thereof.

Upon determining whether the DCI message is configured for activation or for release, the UE may identify the sets of resources which are to be activated or released based on indications of associations between component carriers and sets of resources in the DCI message. The UE may be configured to interpret the indications in the DCI message via RRC signaling. Subsequently, the UE may activate or release the SPS and/or CG resources, across the multiple component carriers, that correspond to the received indication. By enabling a single DCI message to activate or release multiple sets of resources within and/or across multiple component carriers, control signaling within a wireless communications system may be reduced.

Aspects of the disclosure are initially described in the context of wireless communications systems. Aspects of the disclosure are additionally described in the context of example resource configurations and an example process flow. Aspects of the disclosure are further illustrated by and described with reference to apparatus diagrams, system diagrams, and flowcharts that relate to techniques for activating and releasing resources across multiple component carriers.

FIG. 1 illustrates an example of a wireless communications system 100 that supports techniques for activating and releasing resources across multiple component carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for activating and/or releasing multiple SPS and/or CG resources via a single DCI message. In particular, techniques described herein may enable a single DCI message to activate and/or release multiple sets of resources across multiple component carriers. By enabling a single DCI message to activate or release multiple sets of resources within and/or across multiple component carriers, control signaling within a wireless communications system 100 may be reduced.

For example, a UE 115 of the wireless communications system 100 may receive from a base station 105, a single DCI message which may be used to activate or release multiple sets of resources across multiple component carriers at the UE 115. In some aspects, the DCI message may include a DCI message format configured to schedule sets of resources across multiple component carriers. The UE 115 may determine whether a DCI message is configured to activate or release sets of resources across multiple component carriers (as opposed to scheduling) based on a new data indicator (NDI) field in the DCI message. Additionally, the UE 115 may determine whether the DCI message is configured for activation or release of resources across multiple component carriers based on fields or values indicated in the DCI message, including an RV field, an MCS field, an FDRA field, or any combination thereof.

Upon determining whether the DCI message is configured for activation or for release, the UE 115 may identify the sets of resources which are to be activated or released based on indications of associations between component carriers and sets of resources in the DCI message. The UE 115 may be configured to interpret the indications in the DCI message via RRC signaling. For example, the UE 115 may receive an RRC message from the base station, where the RRC message includes a configuration for the UE 115 to interpret the DCI message. For instance, the RRC message may indicate one or more tables for interpreting the DCI message, where each table includes associations between indications of the DCI message (e.g., HARQ process number (HPN) field values, component carrier field values, CIF values), component carriers, and sets of resources. In particular, each table may include associations between indications within the DCI message and one or more mapping pairs, where each mapping pair includes a component carrier and a set of resources which are to be activated or released.

After identifying the sets of resources which are to be activated or released, the UE 115 may activate or release the SPS and/or CG resources, across the multiple component carriers, that correspond to the received indication(s) within the DCI message. By enabling a single DCI message to activate or release multiple sets of resources within and/or across multiple component carriers, control signaling within a wireless communications system may be reduced.

Techniques described herein may enable a single DCI message to activate and/or release multiple sets of resources within and/or across multiple component carriers. For example, techniques described herein may enable a single DCI message to activate a first set of resources (e.g., SPS grant, CG grant) within a first component carrier at the UE 115, and activate a second set of resources (e.g., SPS grant, CG grant) within a second component carrier at the UE 115. By enabling the activation or release of multiple sets of resources within and/or across multiple component carriers, control signaling overhead within the wireless communications system 100 may be reduced, and flexibility of releasing sets of resources may be improved.

Figure 2:
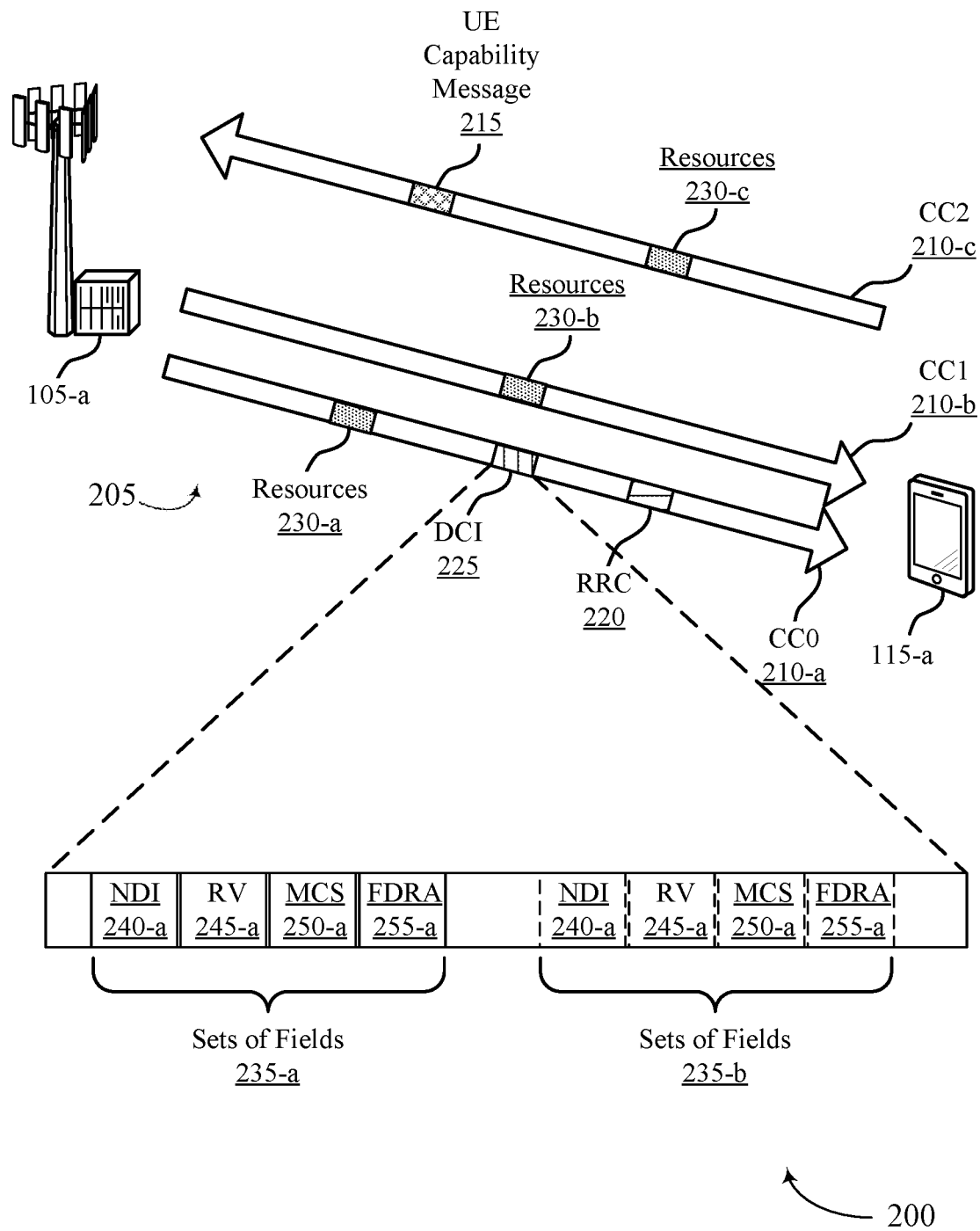
FIG. 2 illustrates an example of a wireless communications system that supports techniques for activating and releasing resources across multiple component carriers in accordance with aspects of the present disclosure.

FIG. 2 illustrates an example of a wireless communications system 200 that supports techniques for activating and releasing resources across multiple component carriers in accordance with aspects of the present disclosure. In some examples, wireless communications system 200 may implement aspects of wireless communications system 100. The wireless communications system 200 may include a base station 105-a and a UE 115-a, which may be examples of UEs 115 and base stations 105, as described with reference to FIG. 1.

The UE 115-a may communicate with the base station 105-a using a communication link 205. In some cases, the communication link 205 may include an example of an access link (e.g., a Uu link). The communication link 205 may include a bi-directional link that can include both uplink and downlink communication. In one aspect, the UE 115-a may transmit uplink transmissions, such as uplink messages or uplink signals, to the base station 105-a using the communication link 205 and the base station 105-a may transmit downlink data transmissions, such as downlink messages or downlink signals, to the UE 115-a using the communication link 205. In some aspects, the communication link 205 may include a set of component carriers 210 for communications between the UE 115-a and the base station 105-a. For example, the communication link 205 may include a first component carrier 210-a (CC1), a second component carrier 210-b (CC2), and a third component carrier 210-c (CC3). Each of the component carriers 210-a, 210-b, and 210-c may be configured for uplink communications, downlink communications, or both. The communication link 205 may include any number of component carriers.

The UEs 115 and the base stations 105 of the wireless communications system 100 may support techniques for activating or releasing multiple SPS and/or CG resources via a single DCI message. In particular, techniques described herein may enable a single DCI message to activate or release multiple sets of resources across multiple component carriers. By enabling a single DCI message to activate or release multiple sets of resources within and/or across multiple component carriers, control signaling within a wireless communications system 100 may be reduced.

For example, the UE 115-a, the base station 105-a, or both, may identify a configuration for communications between the UE 115-a and the base station 105-a on a set of (e.g., multiple) component carriers 210. For example, the configuration may include at least a first set of resources 230-*a* on the first component carrier 210-*a*, a second set of resources on the second component carrier 210-*b*, and a third set of resources 230-*c* on the third component carrier 210-*c*. In some aspects, the first set of resources 230-*a*, the second set of resources 230-*b*, the third set of resources 230-*c*, or any combination thereof, may include a set of downlink resources associated with an SPS grant, a set of uplink resources associated with a CG, or any combination thereof. For example, the first set of resources 230-*a* and the second set of resources may include sets of resources associated with SPS grants, and the third set of resources 230-*c* may include a set of resources associated with a CG. In this regard, the sets of resources 230-*a*, 230-*b*, and 230-*c* may include sets of time resources and sets of frequency resources for communications between the UE 115-*a* and the base station 105-*a*.

In some aspects, UE 115-*a* may transmit a UE capability message 215 to the base station 105-*a*. In some aspects, the UE capability message 215 may indicate that the UE 115-*a* is configured to release two or more sets of resources 230 via a single DCI message 225. Additionally or alternatively, the UE capability message 215 may indicate that the UE 115-*b* is configured to activate and/or release two or more sets of resources 230 across multiple component carriers 210 via a single DCI message 225. In some cases, the UE 115-*a* may transmit the UE capability message 215 based on identifying the configuration for communications between the UE 115-*a* and the base station 105-*a*.

The base station 105-*a* may transmit an RRC message 220 to the UE 115-*a*. In some aspects, the base station 105-*a* may transmit the RRC message 220 to the UE 115-*a* based on identifying the configuration for communications between the UE 115-*a* and the base station 105-*a*, receiving the UE capability message 215, or both. In some aspects, the RRC message 220 may indicate, to the UE 115-*a*, how the UE 115-*a* is to interpret DCI messages 225 received from the base station 105-*a* which are configured to activate or release sets of resources 230. In this regard, the RRC message 220 may include an indication of a configuration for the UE 115-*a* to interpret DCI messages 225 for activating or releasing sets of resources 230. For example, the configuration signaled to the UE 115-*a* to interpret DCI messages 225 may include tables, indices, storage objects, or any combination thereof, regarding how the UE 115-*a* is to interpret various indicators or fields in the DCI message 225, including NDI fields, RV fields, MCS fields, FDRA fields, CIF values, or any combination thereof.

In some aspects, the configuration for the UE 115-*a* to interpret DCI messages 225 may indicate sets of mapping pairs, where each mapping pair includes (e.g., identifies, indicates) a component carrier 210 and a resource for communications between the UE 115-*a* and the base station 105-*a*. For example, a first mapping pair may include {CC0, SPS/CG index}, where the first mapping pair indicates an association between the first component carrier 210-*a* (CC0) and an index associated with an SPS grant or CG on the first component carrier 210-*a*. By way of another example, a second mapping pair may include {CC1, SPS/CG index}, where the second mapping pair indicates an association between the second component carrier 210-*b* (CC1) and an index associated with an SPS grant or CG on the second component carrier.

In some aspects, the configuration for the UE 115-*a* to interpret DCI messages may include one or more tables, indices, storage objects, or any combination thereof, associated with activating and/or releasing resources. In some aspects, each table may include associations between one or more field values (e.g., HPN field values, component carrier field values, CIF values) of DCI messages 225 and the mapping pairs. For example, a table may include associations between HPN field values and one or more mapping pairs. For instance, a table may indicate that a first HPN field value is associated with a single mapping pair (e.g., HPN field value 1={CC1, SPS/CG index}), and a second HPN field value is associated with two mapping pairs (e.g., e.g., HPN field value 2={CC1, SPS/CG index}, {CC2, SPS/CG index}). The configuration for the UE 115-*a* to interpret DCI messages 225 may include any number of tables, where each table may indicate any number of associations between field values and mapping pairs.

In some aspects, the base station 105-*a* may identify one or more sets of resources 230 which are to be activated or released. In some aspects, the base station 105-*a* may identify the sets of resources 230 which are to be activated or released based on the configuration for communications between the UE 115-*a* and the base station 105-*a*, the UE capability message 215, the RRC message 220, or any combination thereof. In some cases, the base station 105-*a* may identify multiple sets of resources 230 across multiple component carriers 210 which are to be activated or released. For example, the base station 105-*a* may identify the first set of resources 230-*a* on the first component carrier 210-*a* and the second set of resources 230-*b* on the second component carrier 210-*b* are to be activated or released.

In some aspects, the base station 105-*a* may transmit a DCI message 225 to the UE 115-*a*. The base station 105-*a* may transmit the DCI message 225 on a component carrier 210 of the set of component carriers 210 of the UE 115-*a*. For example, the base station 105-*a* may transmit the DCI message 225 on the first component carrier 210-*a* of the UE 115-*a*. In some aspects, the base station 105-*a* may transmit the DCI message 225 based on the configuration for communications between the UE 115-*a* and the base station 105-*a*, the UE capability message 215, the RRC message 220, identifying the sets of resources 230 to be released, or any combination thereof.

In some aspects, the DCI message 225 may include a DCI format that controls multiple sets of resources 230 across the multiple component carriers 210. For example, in cases where the configuration for communications between the UE 115-*a* the base station 105-*a* include the first set of resources 230-*a* on the first component carrier 210-*a* and the second set of resources 230-*b* on the second component carrier 210-*b*, the DCI message 225 may include a DCI format which is configured to control the first set of resources 230-*a* and the second set of resources 230-*b* across the first component carrier 210-*a* and the second component carrier 210-*b*, respectively. In this regard, the DCI format of the DCI message 225 may be configurable by the base station 105-*a* to perform one of scheduling, activating, or releasing resources (e.g., first set of resources 230-*a*, second set of resources 230-*b*) across the respective component carriers 210 of the UE 115-*a*.

In some aspects, the DCI message 225 may include one or more indications (e.g., field values) indicating that the UE 115-*a* is to activate or release one or more sets of resources 230. For example, the DCI message 225 may include one or more indications (e.g., field values) indicating that the UE 115-*a* is to release the first set of resources 230-*a* and the second set of resources 230-*b*. The one or more indications indicating that the UE 115-*a* is to release sets of resources 230 may include, but are not limited to, HPN field values, CIF values, or both. Moreover, in some aspects, the one or more field values may be associated with field values indicated in the one or more tables of the configuration for the UE 115-*b* to interpret DCI messages 225. In this regard, the one or more field values indicated in the DCI message 225 may be used to reference the one or more tables, indices, storage objects, or the like, included in the configuration for the UE 115-*a* to interpret DCI messages 225 to identify sets of resources 230 which are to be activated or released.

In some cases, various indications within the DCI message 225 (e.g., NDI fields, RV fields, MCS fields, FDRA fields, or any combination thereof) may be common across multiple component carriers 210. For example, in cases where the DCI message is configured for activation or release of the first set of resources 230-*a* on the first component carrier 210-*a* and the second set of resources 230-*b* on the second component carrier 210-*b*, the DCI message 225 may include a set of fields 235-*a* (e.g., NDI field 240-*a*, RV field 245-*a*, MCS field 250-*a*, FDRA field 255-*a*, or any combination thereof), where the set of fields 235-*a* is associated with both the first component carrier 210-*a* and the second component carrier 210-*b*.

Additionally or alternatively, the DCI message 225 may include multiple sets of fields 235, where each set of fields 235 is associated with a respective component carrier 210. For example, in cases where the DCI message is configured for activation or release of the first set of resources 230-*a* on the first component carrier 210-*a* and the second set of resources 230-*b* on the second component carrier 210-*b*, the DCI message 225 may include a first set of fields 235-*a* (e.g., NDI field 240-*a*, RV field 245-*a*, MCS field 250-*a*, FDRA field 255-*a*, or any combination thereof), which is associated with the first component carrier 210-*a*, and a second set of fields 235-*b* (e.g., NDI field 240-*b*, RV field 245-*b*, MCS field 250-*b*, FDRA field 255-*b*, or any combination thereof), which is associated with the second component carrier 210-*b*. For instance, a first RV field 245-*a* in the first set of fields 235-*a* may be associated with the first component carrier 210-*a*, and a second RV field 245-*b* in the second set of fields 235-*b* may be associated with the second component carrier 210-*a*. In some aspects, some fields may be common across multiple component carriers 210, while other fields may be associated with only a single component carrier 210.

In some cases, including multiple sets of fields 235 associated with different component carriers 210 may enable the DCI message 225 to activate/release sets of resources 230 on one component carrier 210, and schedule transmissions or re-transmissions of sets of resources on another component carrier. For example, the first NDI field 240-*a* in the first set of fields 235-*a* may include a value associated with an activation/release of resources on the first component carrier 210-*a*, and the second NDI field 240-*b* in the second set of fields 235-*b* may include a value associated with scheduling a re-transmission of resources 230 on the second component carrier 210-*b*.

In some aspects, the base station 105-*a* may encode (e.g., scramble) at least a portion (e.g., CRC portion) of the DCI message 225 according to a radio network temporary identifier (RNTI) associated with release (e.g., a configured scheduling radio network temporary identifier (CS-RNTI)). The base station 105-*a* may encode at least a portion of the DCI message 225 in order to indicate, to the UE 115-*a*, that the one or more sets of resources 230 for communications between the UE 115-*a* and the base station 105-*a* are to be activated or released. In this regard, encoding at least a portion of the DCI message 225 according to CS-RNTI may enable the UE 115-*a* to determine that the DCI message 225 is configured for activation/release of sets of resources 230 across one or more component carriers 210, as opposed to scheduling transmissions or re-transmissions of sets of resources 230 across multiple component carriers 210.

In some cases, UE 115-*a* may determine that the DCI message 225 controls the multiple sets of resources 230 across the multiple component carriers 210. In this regard, the UE 115-*a* may determine that the DCI message 225 includes a DCI format which is configured for scheduling, activating, or releasing multiple sets of resources 230 across multiple component carriers 210 (e.g., cross-carrier scheduling, cross-carrier activation, cross-carrier release, or any combination thereof). In some aspects, the UE 115-*a* may determine that the DCI message 225 controls the multiple sets of resources 230 based on identifying the configuration for communications between the UE 115-*a* and the base station 105-*a*, the UE capability message 215, the RRC message 220, the DCI message 225, or any combination thereof.

In some aspects, the UE 115-*a* may determine that the DCI message 225 controls multiple sets of resources 230 based on determining that at least a portion (e.g., a cyclic redundancy check (CRC) portion) of the DCI message 225 is encoded (e.g., scrambled) according to CS-RNTI. For example, in some cases, the UE 115-*a* may receive the DCI message 225, and may determine that the DCI message 225 controls the first set of resources 230-*a* and the second set of resources 230-*b* based on determining that at least a portion of the DCI message 225 is encoded according to CS-RNTI.

In some aspects, the UE 115-*a* may determine that the DCI message 225 is configured to activate or release one or more sets of resources 230 (as opposed to scheduling transmissions or re-transmissions of sets of resources 230). In some aspects, the UE 115-*a* may determine that the DCI message 225 is configured to activate or release one or more sets of resources based on one or more NDI fields 240 of the DCI message 225. For instance, in some cases, a first value (e.g., NDI=0) of an NDI field 240 (e.g., NDI field 240-*a* and 240-*b*) within the DCI message 225 may indicate that the DCI message 225 is configured for release and/or activation of sets of resources 230 (e.g., release and/or activation of SPS grants and/or CGs), and a second value (e.g., NDI=1) of the NDI field 240 within the DCI message 225 may indicate that the DCI message 225 is configured for scheduling transmissions or re-transmissions of resources 230 (e.g., scheduling re-transmissions of SPS grants and/or CGs). In this example, the UE 115-*a* may determine that the DCI message 225 is configured to activate or release resources 230 based on the NDI field 240 of the DCI message 225 indicating the first value (e.g., NDI=0).

As noted previously herein, a single NDI field 240 (e.g., NDI field 240-*a*) may be associated with multiple component carriers 210. For example, the NDI field 240-*a* may be associated with the first component carrier 210-*a* and the second component carrier 210-*b*, such that the single NDI field 240-*a* indicates whether the DCI message 225 is configured for activation or release of the first and second sets of resources 230-*a* and 230-*b* on the first and second component carriers 210-*a* and 210-*b*, respectively. Additionally or alternatively, the DCI message 225 may include multiple NDI fields 240 associated with multiple component carriers 210. For example, the DCI message 225 may include a first NDI field 240-*a* associated with the first component carrier 210-*a*, and a second NDI field 240-*b* associated with the second component carrier 210-*b*.

In some aspects, the UE 115-*a* may be configured to differentiate between activation and release. In this regard, the UE 115-a may determine whether the DCI message 225 is configured for activation, or whether the DCI message 225 is configured for release. In some aspects, the UE 115-a may determine whether the DCI message 225 is configured to activate of release one of the one or more sets of resources 230 based on the one or more indications in the DCI message 225. Indications within the DCI message which the UE 115-a may use to differentiate between activation and release may include RV fields 245, MCS fields 250, FDRA fields 255, or any combination thereof. Additionally or alternatively, the UE 115-a may determine that the DCI message 225 is configured for one of activation or release of sets of resources 230 based on types of FDRA fields 255 (e.g., FDRA Type 0, FDRA Type 1, FDRA Type 2) within the DCI message 225.

For example, in some cases, a first value of an RV field 245 (e.g., RV=0) associated with a given component carrier 210 may be associated with activation and/or release of sets of resources 230 on the component carrier 210, while a second value of the RV field 245 (e.g., RV=1) associated with the given component carrier 210 may be associated with scheduling of sets of resources 230 on the component carrier 210. For example, in cases where a single RV field 245-a within the DCI message 225 is associated with the first component carrier 210-a and the second component carrier 210-b, a first value of the RV field 245-a (e.g., RV=0) may indicate that the DCI message 225 is configured for activation and/or release of sets of resources 230 on the first and second component carriers 210-a and 210-b.

In cases where a first value of the RV field 245 (e.g., RV=0) is associated with both activation and release of resources 230, the UE 115-a may be configured to differentiate between activation and release within a given component carrier based on additional fields or indicators (e.g., MCS fields 250, FDRA fields 255) of the DCI message 225. For example, in the case of activation/release of sets of uplink resources (e.g., CG, third set of resources 230-c)) on the third component carrier 210-c, the UE 115-a may determine that the DCI message 225 is configured to release the third set of resources 230-c (as opposed to activation of the third set of resources 230-c) if the RV field 245 associated with the third component carrier 210-c (e.g., first RV field 245-a, second RV field 245-b) is set to a first value (e.g., RV field=0), the MCS field 250 associated with the third component carrier 210-c is set to a second value (e.g., MCS field=1), and the FDRA field 255 associated with the third component carrier 210-c is set to a first value (e.g., FDRA field=0) for FDRA Type 2 with µ=1. Conversely, in the case of activation/release of sets of uplink resources (e.g., CG, third set of resources 230-c) on the third component carrier 210-c, the UE 115-c may determine that the DCI message 225 is configured for activation of the third set of resources 230-c (as opposed to release of the third set of resources 230-c) if the RV field 245 associated with the third component carrier 210-c is set to a first value (e.g., RV field=0), and the MCS field 250 associated with the third component carrier 210-c is set to a value different from the second value (e.g., MCS field≠1), or the FDRA field 255 associated with the third component carrier 210-c is set to a value different from the first value (e.g., FDRA field≠0) for FDRA Type 2 with µ=1.

By way of another example, in the case of activation/release of sets of downlink resources (e.g., SPS grants) on a given component carrier, the UE 115-a may determine that the UE 115-a is configured for release of the sets of resources 230 (as opposed to activation of the sets of resources 230) if the RV field 245 associated with the given component carrier 210 is set to a first value (e.g., RV field=0), the MCS field 250 associated with the given component carrier 210 is set to a second value (e.g., MCS field=1), and the FDRA field 255 associated with the given component carrier 210 is set to a first value (e.g., FDRA field=0) for FDRA Type 0 or for dynamic switch, or set to a second value (e.g., FDRA field=1) for FDRA Type 1. Conversely, in the case of activation/release of sets of downlink resources (e.g., SPS grants) on the given component carrier 210, the UE 115-a may determine that the DCI message 225 is configured for activation of the sets of resources 230 (as opposed to release of the sets of resources 230) if the RV field 245 associated with the given component carrier 210 is set to a first value (e.g., RV field=0), and the MCS field 250 associated with the given component carrier 210 is set to a value different from the second value (e.g., MCS field≠1), or the FDRA field 255 associated with the given component carrier 210 is set to a value different from the first value (e.g., FDRA field≠0) for FDRA Type 2 with µ=1 or set to a value different from the second value (e.g., FDRA field≠1) for FDRA Type 1.

Additionally or alternatively, the UE 115-a may determine that the DCI message 225 is configured to activate (as opposed to release) the one or more sets of resources 230 based on a CORESET and/or search space on which the DCI message 225 was received. In this regard, the base station 105-a may transmit the DCI message 225 on a given CORESET or search space as an indication as to whether the DCI message 225 is configured for activation. The UE 115-a may be configured to interpret whether the DCI message 225 is configured for activation based on the CORESET or search space based on the configuration for interpreting the DCI messages 225 (e.g., the configuration received via the RRC message 220).

In some cases, the UE 115-a may validate (e.g., determine, confirm) that the DCI message 225 is configured for activation and/or release of sets of resources 230 based on the one or more NDI fields 240 and the one or more RV fields 245. For example, as noted previously herein, the UE 115-a may determine that the DCI message 225 is configured for activation or release of sets of resources 230 across one or more component carriers 210 if the NDI field(s) 240 of the DCI message 225 associated with the respective component carriers 210 include a second value (e.g., NDI=1). In such cases, the UE 115-a may validate (e.g., confirm) that the DCI message 225 is configured for activation or release by determining that RV fields(s) 245 associated with the respective component carriers 210 include the first value (e.g., RV field=0). Conversely, if the UE 115-a determines that an NDI field 240 associated with a given component carrier 210 incudes the second value associated with activation/release (e.g., NDI=0), but the RV field 245 for the given component carrier 210 includes a value different from the first value (e.g., RV field≠0), the UE 115-a may fail to validate (e.g., invalidate) that the DCI message 225 is configured for activation/release. In such cases, the UE 115-a may discard at least a portion of the DCI message 225 based on invalidating the DCI message 225.

For example, in cases where the DCI message 225 includes a single set of fields 235-a associated with the first component carrier 210-a and the second component carrier 210-b, the UE 115-a may determine that the NDI field 240-a includes the second value associated with activation/release (e.g., NDI field=1). In cases where the UE 115-a determines that the RV field 245-a also includes the first value associated with activation/release (e.g., RV=0), the UE 115-a may validate that the DCI message 225 is configured for activation or release of resources 230 on the first and second component carriers 210-*a* and 210-*b*. Conversely, in cases where the UE 115-*a* determines that the RV field 245-*a* includes a value different from the first value (e.g., RV field≠0), the UE 115-*a* may invalidate the DCI message 225, and may discard, ignore, or otherwise disregard the DCI message 225 based on the invalidation.

In other words, the UE 115-*a* may validate the DCI message 225 (or at least a portion of the DCI message 225) in cases where both the respective NDI fields 240 and RV fields 245 indicate that the DCI message 225 is configured for activation/release. Conversely, the UE 115-*b* may invalidate the DCI message 225 in cases where the NDI fields 240 indicate that the DCI message 225 is configured for activation/release, but the RV fields 245 do not include values associated with activation/release.

By way of another example, in cases where the DCI message 225 includes a first set of fields 235-*a* (e.g., first NDI field 240-*a*, first RV field 245-*a*, or both) associated with the first component carrier 210-*a* and a second set of fields 235-*b* (e.g., second NDI field 240-*b*, second RV field 245-*b*, or both), the UE 115-*a* may validate or invalidate the portions associated with the respective component carriers 210 separately. For instance, the UE 115-*a* may determine that both the first and the second NDI fields 240-*a* and 240-*b* include the second value associated with activation/release (e.g., NDI field=1). In cases where the UE 115-*a* determines that both the first and second RV fields 245-*a* and 245-*b* also include the first value associated with activation/release (e.g., RV=0), the UE 115-*a* may validate that the DCI message 225 is configured for activation or release of resources 230 across both the first and second component carriers 210-*a* and 210-*b*. Conversely, in cases where the UE 115-*a* validates the first RV field 245-*a* associated with the first component carrier 210-*a* but determines that the second RV field 245-*b* includes a value different from the first value (e.g., RV field≠0), the UE 115-*a* may validate the DCI message 225 for the first component carrier 210-*a*, but may invalidate the DCI message 225 for the second component carrier 210-*b*. In this regard, the UE 115-*a* may discard, ignore, or otherwise disregard the portion of the DCI message 225 associated with the second component carrier 210-*b* (e.g., second set of fields 235-*b*) based on the invalidation. Moreover, in cases where the UE 115-*a* invalidates the DCI message 225 for both the first component carrier 210-*a* and the second component carrier 210-*b*, the UE 115-*a* may discard, ignore, or otherwise disregard the portions of the DCI message 225 associated with both the first and second component carriers 210-*a* and 210-*b* (e.g., first set of fields 235-*a*, seconds set of fields 235-*b*).

In some aspects, the UE 115-*a* may identify one or more sets of resources 230 which are to be activated or released. In some aspects, the UE 115-*a* may identify the one or more sets of resources 230 which are to be activated or released based on one or more indications, values, or fields (e.g., HPN field values, component carrier field values, CIF values) indicated in the DCI message 225. Moreover, the UE 115-*a* may determine resources 230 to be activated or released based on identifying the one or more indications (e.g., HPN field values, CIF values) in the DCI message referencing one or more configurations (e.g., tables, indices, storage objects) which associate indications with mapping pairs of component carriers 210 and sets of resources 230.

For example, in cases where the UE 115-*a* is configured with a single configuration (e.g., single table) for interpreting indications within the DCI message 225, the configuration may include associations between HPN field values and mapping pairs. In this example, the UE 115-*a* may identify one or more sets of resources 230 to be released by referencing the table and identifying the sets of resources 230 associated with the mapping pairs corresponding to an HPN field value indicated in the DCI message 225. For instance, the UE 115-*a* may identify that the DCI message 225 includes a HPN field value of 10, and may reference the selected configuration (e.g., table) table to determine the HPN field value of 10 is associated with two mapping pairs: {CC1, SPS/CG index 4}, {CC2, SPS/CG index 3} (e.g., HPN field value 10={CC1, SPS/CG index 4}, {CC2, SPS/CG index 3}). In this example, the UE 115-*a* may identify the sets of resources 230 corresponding to the SPS/CG index 4 on CC1 and the SPS/CG index 3 on CC2 are to be one of activated or released.

By way of another example, the UE 115-*a* and/or the base station 105-*a* may identify sets of resources 230 to be released based on multiple field values. For example, the DCI message 225 may include a first indication including a component carrier field value (e.g., CIF value) and a second indication including an HPN field value. In this example, the component carrier field value (e.g., CIF value) may be associated with the first component carrier 210-*a* and the second component carrier 210-*b*, and the second field value may be associated with one or more sets of resources 230 (e.g., second field value={SPS/CG index 2}, {SPS/CG index 7}). These associations may be indicated in one or more configurations (e.g., tables). In this example, the UE 115-*a* may identify the first component carrier 210-*a* and the second component carrier 210-*b* based on the component carrier field value, and may identify a first set of resources 210 corresponding to {SPS/CG index 2} and a second set of resources corresponding to {SPS/CG index 7} based on the HPN field value. In this regard, the UE 115-*a* may determine that the sets of resources 230 associated with {SPS/CG index 2} and {SPS/CG index 7} are to be released on the first component carrier 210-*a* and the second component carrier 210-*b*.

Accordingly, the UE 115-*a* and/or the base station 105-*a* may identify sets of resources 230 to be activated or released on one or multiple component carriers 210 based on a combination of multiple indications within the DCI messages 225 (e.g., HPN field values, component carrier field values, CIF values). In other words, multiple sets of resources 230 which are to be activated or released across multiple component carriers 210 may be jointly indicated by multiple indications (e.g., field values), which may be used to reference one or more tables, indices, storage objects, or any combination thereof.

Upon identifying sets of resources 230 which are to be activated or released, the UE 115-*a* may activate or release the sets of resources. In some aspects, the UE 115-*b* may activate the sets of resources 230 by communicating over the sets of resources 230. Conversely, the UE 115-*a* may release the sets of resources 230 by refraining from using the sets of resources 230. In some aspects, the UE 115-*a* may transmit an uplink transmission (e.g., acknowledgement message) to the base station 105-*a* indicating that the sets of resources 230 have been activated or released.

The UE 115-*a*, the base station 105-*a*, or both, may determine that the sets of resources 230 are activated or released based on identifying the configuration for communications between the UE 115-*a* and the base station 105-*a*, the UE capability message 215, the RRC message 220, the DCI message 225, determining the DCI message 225 controls the sets of resources 230, determining the DCI message 225 activates or receives resources 230, identifying the sets of resources 230 to be activated or released, activating or releasing the sets of resources 230, or any combination thereof.

Techniques described herein may enable multiple a single DCI message to active and/or release multiple sets of resources within and/or across multiple component carriers. For example, techniques described herein may enable a single DCI message to activate a first set of resources (e.g., SPS grant, CG grant) within a first component carrier at the UE 115, and activate a second set of resources (e.g., SPS grant, CG grant) within a second component carrier at the UE 115. By enabling the activation or release of multiple sets of resources within and/or across multiple component carriers, control signaling overhead within the wireless communications system 100 and 200 may be reduced, and flexibility of releasing sets of resources may be improved.

Figure 3:
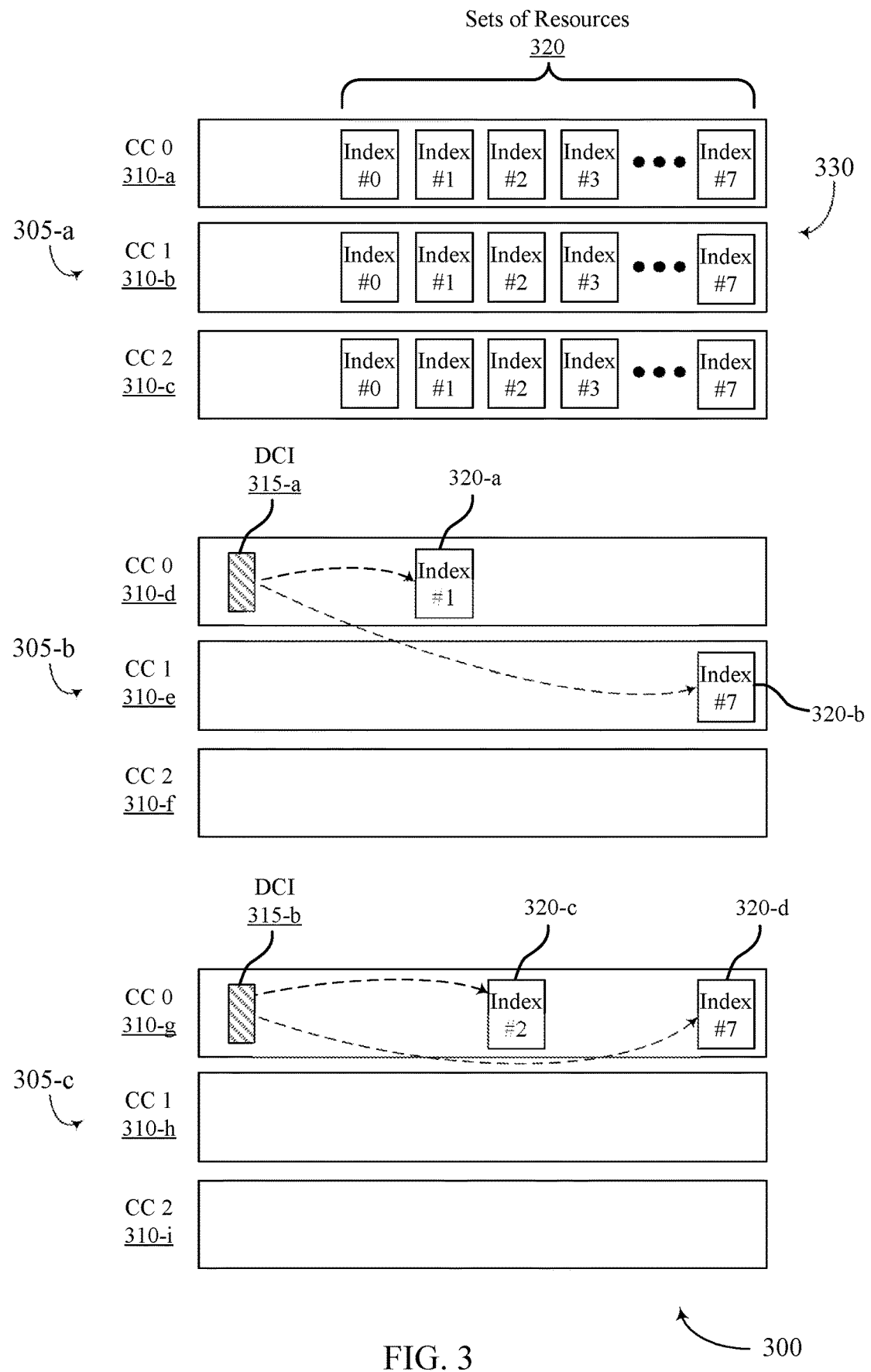
FIG. 3 illustrates an example of a resource allocation scheme that supports techniques for activating and releasing resources across multiple component carriers in accordance with aspects of the present disclosure.

FIG. 3 illustrates an example of a resource allocation scheme 300 that supports techniques for activating and releasing resources across multiple component carriers in accordance with aspects of the present disclosure. In some examples, resource allocation scheme 300 may implement, or be implemented by, aspects of wireless communications system 100 and 200. In some aspects, the resource allocation scheme 300 in FIG. 3 illustrates a first resource configuration 305-a, a second resource configuration 305-b, and a third resource configuration 305-c.

In some cases, a UE 115, a base station 105, or both, may identify a configuration for communications between the UE 115 and the base station 105 on a set of (e.g., multiple) component carriers 310. In some aspects, the configuration may include at least a first set of resources on the first component carrier 310-a, and a second set of resources on the second component carrier 310-b. For example, referring to resource configuration 305-a, the UE 115 and/or the base station 105 may determine a configuration 330, where the configuration 330 includes sets of resources across a first component carrier 310-a, a second component carrier 310-b, and a third component carrier 310-c. In some aspects, the sets of resources 320 may include sets of downlink resources associated with an SPS grant, sets of uplink resources associated with a CG, or any combination thereof.

As noted previously herein, techniques described herein may enable a single DCI message 315 to activate or release multiple sets of resources 320 across multiple component carriers 310. For example, referring to resource configuration 305-b illustrated in FIG. 3, a base station 105 may transmit a DCI message 315-a to a UE 115 over a first component carrier 310-d. In some aspects, the UE 115 may be configured to determine that the DCI message 315-a is configured to activate or release sets of resources. In this regard, the UE 115 may be configured to determine whether the DCI message 315-a is configured for activation or release based on one or more indications in the DCI message 315-a (e.g., NDI field, RV field, MCS field, FDRA field, HPN field, CIF, or any combination thereof). Additionally the UE 115 may be configured to interpret the DCI message 315-a based on a configuration for interpreting DCI messages 315 received from the base station 105 (e.g., configuration received via RRC signaling). In this regard, UE 115 may be configured to identify and select one or more tables, indices, storage objects, or other configurations which will be referenced to determine which sets of resources 320 will be activated or released. The UE 115 may be configured to identify and select one or more tables, indices, or storage objects which will be referenced to determine which sets of resources 320 will be activated or released based on a component carrier 310 on which the DCI message 315-a was received, field values (e.g., HPN field values, component carrier field values, CIF values) indicated in the DCI message 315-a, or any combination thereof.

Continuing with reference to resource configuration 305-b, in some cases, the UE 115 may identify that the DCI message 315-a is configured for activation (as opposed to release). In this example, the UE 115 may identify one or more indications (e.g., HPN field values, CIF values) in the DCI message 315-a, and determine that the one or more indications within the DCI message 315-a are associated with a first set of resources 320-a on the first component carrier 310-d and a second set of resources 320-b on the second component carrier 310-e. Subsequently, the UE 115-a may activate the first set of resources 320-a and the second set of resources 320-b (e.g., determine that the sets of resources are activated) based on the one or more indications.

In other cases, the UE 115 may identify that the DCI message 315-a is configured for release (as opposed to activation). In this example, the UE 115 may identify one or more indications (e.g., HPN field values, CIF values) in the DCI message 315-a, and determine that the one or more indications within the DCI message 315-a are associated with the first set of resources 320-a on the first component carrier 310-d and the second set of resources 320-b on the second component carrier 310-e. Subsequently, the UE 115-a may release the first set of resources 320-a and the second set of resources 320-b (e.g., determine that the sets of resources are released) based on the one or more indications.

In additional or alternative cases, techniques herein may be configured to activate or release multiple sets of resources 320 within a single component carrier. For example, referring to resource configuration 305-c, a UE 115 may receive a DCI message 315-b on a first component carrier 310-g, and may determine that the DCI message 315-b is configured for activating or releasing sets of resources based on one or more indications in the DCI message 315-b (e.g., NDI field, RV field, MCS field, FDRA field, or any combination thereof). In this example, the UE 115 may identify one or more indications (e.g., HPN field values, CIF values) in the DCI message 315-b, and determine that the one or more indications within the DCI message 315-b are associated with a first set of resources 320-c on the first component carrier 310-g and a second set of resources 320-d on the first component carrier 310-d. Subsequently, the UE 115-a may activate or release the first set of resources 320-c and the second set of resources 320-d (e.g., determine that the sets of resources are one of activated or released) based on the one or more indications. Techniques described herein may additionally or alternatively enable the DCI message 315-a to activate or release multiple sets of resources 320 on a different component carrier 310 (e.g., second component carrier 310-h) than the component carrier 310 on which the DCI message 315-b was received (e.g., first component carrier 310-g).

The resource configurations 305-a, 305-b, and 305-c described herein may enable a single DCI message 315 to activate or release multiple sets of resources 320 within and/or across multiple component carriers 310. For example, techniques described herein may enable a single DCI message 315-a to activate a first set of resources 320-a (e.g., SPS grant, CG grant) within a first component carrier 310-d at the UE 115, and activate a second set of resources 320-b (e.g., SPS grant, CG grant) within a second component carrier 310-e at the UE 115. By enabling the activation or release of multiple sets of resources 320 within and/or across multiple component carriers 310, control signaling overhead within the wireless communications system 100 and 200 may be reduced, and flexibility of activating and releasing sets of resources 320 may be improved.

Figure 4:
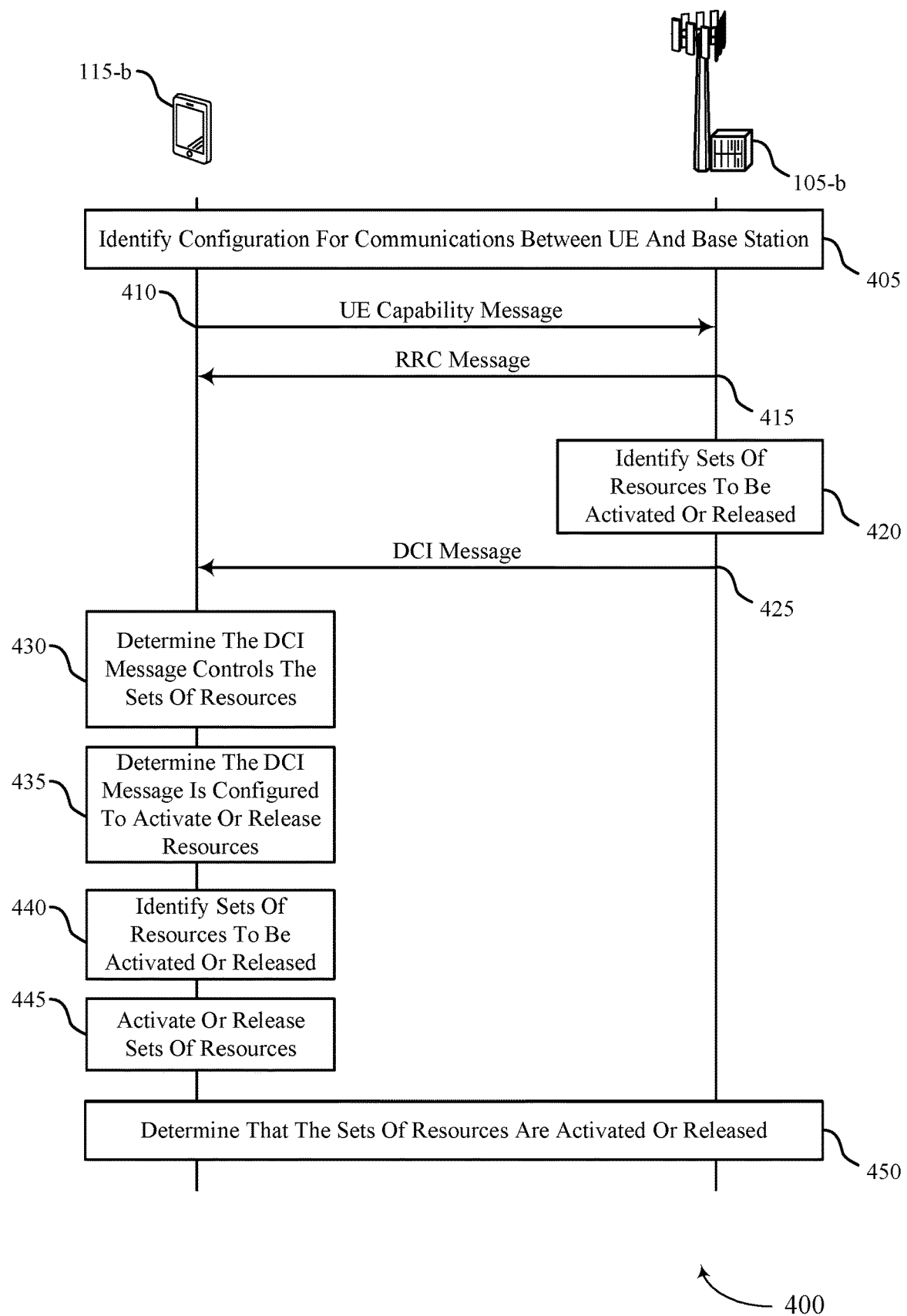
FIG. 4 illustrates an example of a process flow that supports techniques for activating and releasing resources across multiple component carriers in accordance with aspects of the present disclosure.

FIG. 4 illustrates an example of a process flow 400 that supports techniques for activating and releasing resources across multiple component carriers in accordance with aspects of the present disclosure. In some examples, process flow 400 may implement, or be implemented by, aspects of wireless communications system 100 or 200, resource allocation scheme 300, or any combination thereof. The process flow 400 may illustrate receiving a DCI, determining the DCI message is configured for activating or releasing sets of resources, identifying sets of resources to be activated or released, and determining the sets of resources are activated or released, as described with reference to FIGS. 1-5, among other aspects.

In some aspects, process flow 400 may include a UE 115-b and a base station 105-b which may be examples of corresponding devices as described herein. The UE 115-b illustrated in FIG. 4 may be an example of the UE 115-a illustrated in FIG. 2. Similarly, the base station 105-b illustrated in FIG. 4 may be an example of the base station 105-a illustrated in FIG. 2.

In some aspects, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-b, the base station 105-b, or both, may identify a configuration for communications between the UE 115-b and the base station 105-b on a set (e.g., multiple) of component carriers. In this regard, the configuration may include at least a first set of resources on a first component carrier of the set of component carriers, and a second set of resources on a second component carrier of the set of component carriers. In some aspects, the first set of resources, the second set of resources, or both, may include a set of downlink resources associated with an SPS grant, a set of uplink resources associated with a CG, or any combination thereof. In this regard, the first and second sets of resources may include sets of time resources and sets of frequency resources for communications between the UE 115-b and the base station 105-b.

At 410, the UE 115-b may transmit a UE capability message to the base station 105-b. In some aspects, the UE capability message may indicate that the UE 115-b is configured to release two or more sets of resources via a single DCI message. Additionally or alternatively, the UE capability message may indicate that the UE 115-b is configured to activate and/or release two or more sets of resources across multiple component carriers via a single DCI message. In some cases, the UE 115-b may transmit the UE capability message based on identifying the configuration for communications between the UE 115-b and the base station 105-b at 405.

At 415, the base station 105-b may transmit an RRC message to the UE 115-b. In some aspects, the base station 105-b may transmit the RRC message to the UE 115-b based on identifying the configuration for communications between the UE 115-b and the base station 105-b at 405, receiving the UE capability message at 410, or both.

In some aspects, the RRC message may indicate, to the UE 115-b, how the UE 115-b is to interpret DCI messages received from the base station 105-b which are configured to activate or release sets of resources. In this regard, the RRC message may include an indication of a configuration for the UE 115-b to interpret DCI messages for activating or releasing sets of resources. For example, the configuration signaled to the UE 115-b for the UE 115-b to use to interpret DCI messages may include tables, indices, storage objects, or any combination thereof, regarding how the UE 115-b is to interpret various indicators or fields in the DCI message, including NDI fields, RV fields, MCS fields, FDRA fields, CIF values, or any combination thereof.

At 420, the base station 105-b may identify one or more sets of resources which are to be activated or released. In some aspects, the base station 105-b may identify the sets of resources which are to be activated or released based on identifying the configuration for communications between the UE 115-b and the base station 105-b at 405, receiving the UE capability message at 410, transmitting the RRC message at 415, or any combination thereof. In some cases, the base station 105-b may identify multiple sets of resources across multiple component carriers which are to be activated or released. For example, the base station 105-b may identify a first set of resources on a first component carrier and a second set of resources on a second component carrier which are to be activated or released.

At 425, the base station 105-b may transmit a DCI message to the UE 115-b. The base station 105-b may transmit the DCI message on a component carrier of the set of component carriers at the UE 115-b. For example, the base station 105-b may transmit the DCI message on a first component carrier of the UE 115-b. In some aspects, the base station 105-b may transmit the DCI message based on identifying the configuration for communications between the UE 115-b and the base station 105-b at 405, receiving the UE capability message at 410, transmitting the RRC message at 415, identifying the sets of resources to be released at 420, or any combination thereof.

In some aspects, the DCI message may include a DCI format that controls multiple sets of resources across the multiple component carriers. For example, in cases where the UE 115-b and/or the base station 105-b identify a first set of resources on a first component carrier and a second set of resources on a second component carrier, the DCI message may include a DCI format which is configured to control the first set of resources and the second set of resources across the first component carrier and the second component carrier, respectively. In this regard, the DCI format of the DCI message transmitted at 425 may be configurable by the base station 105-b to perform one of scheduling, activating, or releasing resources (e.g., first set of resources, second set of resources) across the set of component carriers of the UE 115-b.

In some aspects, the DCI message may include one or more indications (e.g., field values) indicating that the UE 115-b is to activate or release one or more sets of resources. For example, in cases where the configuration identified at 405 includes a first set of resources on a first component carrier and a second set of resources on a second component carrier, the DCI message may include on or more indications (e.g., field values) indicating that the UE 115-b is to release the first and second sets of resources. The one or more indications indicating that the UE 115-b is to release resources may include, but are not limited to, HPN field values, CIF values, or both. Moreover, in some aspects, the one or more field values may be associated with field values indicated in the one or more tables of the configuration for the UE 115-*b* to interpret DCI messages. In this regard, the one or more field values indicated in the DCI message may be used to reference the one or more tables of the configuration for the UE 115-*b* to interpret DCI messages to identify sets of resources which are to be activated or released.

At 430, the UE 115-*b* may determine that the DCI message controls the multiple sets of resources across the multiple component carriers. In this regard, the UE 115-*b* may determine that the DCI message includes a DCI format which is configured for scheduling, activating, or releasing multiple sets of resources across multiple component carriers (e.g., cross-carrier scheduling, cross-carrier activation, cross-carrier release, or any combination thereof). In some aspects, the UE 115-*b* may determine that the DCI message controls the multiple sets of resources based on identifying the configuration for communications between the UE 115-*b* and the base station 105-*b*, transmitting the UE capability message at 410, receiving the RRC message at 415, receiving the DCI message at 425, or any combination thereof.

In some aspects, the UE 115-*b* may determine that the DCI message controls multiple sets of resources based on determining that at least a portion (e.g., a CRC portion) of the DCI message is encoded (e.g., scrambled) according to CS-RNTI. For example, in some cases, the UE 115-*b* may identify a first set of resources on a first component carrier and a second set of resources on a second component carrier. In this example, the UE 115-*b* may receive the DCI message, and may determine that the DCI message controls the first set of resources and the second set of resources based on determining that at least a portion of the DCI message is encoded according to CS-RNTI.

At 435, the UE 115-*b* may determine that the DCI message received at 425 is configured to activate or release one or more sets of resources (as opposed to scheduling transmissions or re-transmissions of sets of resources). In some aspects, the UE 115-*b* may determine that the DCI message is configured to activate or release one or more sets of resources (as opposed to scheduling transmissions or re-transmissions of sets of resources) based on identifying the configuration for communications between the UE 115-*b* and the base station 105-*b*, transmitting the UE capability message at 410, receiving the RRC message at 415, receiving the DCI message at 425, one or more indications in the DCI message, or any combination thereof.

For example, in some aspects, the UE 115-*b* may determine that the DCI message is configured to activate or release sets of resources based on one or more NDI fields of the DCI message. For instance, in some cases, a first value of the NDI field (e.g., NDI=0) within the DCI message may indicate that the DCI message is configured for release and/or activation of sets of resources (e.g., release and/or activation of SPS grants and/or CGs), and a second value of the NDI field (e.g., NDI=1) within the DCI message may indicate that the DCI message is configured for scheduling transmissions or re-transmissions of resources (e.g., scheduling re-transmissions of SPS grants and/or CGs). In this example, the UE 115-*b* may determine that the DCI message received at 425 is configured to activate or release resources based on the NDI field of the DCI message indicating the first value (e.g., NDI=0).

Additionally, the UE 115-*b* may be configured to differentiate between activation and release. In this regard, the UE 115-*b* may determine whether the DCI message is configured for activation, or whether the DCI message is configured for release. In some aspects, the UE 115-*b* may determine whether the DCI message is configured to one of activate of release the one or more sets of resources based on one or more indications in the DCI message. Indications within the DCI message which the UE 115-*b* may use to differentiate between activation and release may include RV fields, MCS fields, FDRA fields, or any combination thereof. Additionally or alternatively, the UE 115-*b* may determine that the DCI message is configured for one of activation or release of sets of resources based on types of FDRA fields within the DCI message, a CORESET on which the DCI message was received, a search space on which the DCI message was received, or any combination thereof.

At 440, the UE 115-*b* may identify one or more sets of resources which are to be activated or released. In some aspects, the UE 115-*b* may identify the one or more sets of resources which are to be activated or released based on identifying the configuration for communications between the UE 115-*b* and the base station 105-*b* at 405, transmitting the UE capability message at 410, receiving the RRC message at 415, receiving the DCI message at 420, determining the DCI message controls the sets of resources at 430, determining the DCI message is configured for activation or release at 435, or any combination thereof.

In some aspects, the UE 115-*b* may identify the sets of resources which are to be released based on one or more indications, values, or fields (e.g., HPN field values, component carrier field values, CIF values) indicated in the DCI message. Moreover, the UE 115-*b* may determine resources to be activated or released based on identifying the one or more indications (e.g., HPN field values, CIF values) in the DCI message within one or more configurations (e.g., tables, indices, storage objects) which associate indications with mapping pairs of component carriers and sets of resources.

Accordingly, the UE 115-*b* and/or the base station 105-*b* may identify sets of resources to be activated or released on one or multiple component carriers based on a combination of multiple indications within the DCI messages (e.g., HPN field values, component carrier field values, CIF values). In other words, multiple sets of resources which are to be activated or released across multiple component carriers may be jointly indicated by multiple indications (e.g., field values), which may be used to reference one or more tables, indices, storage objects, or any combination thereof.

At 445, the UE 115-*b* may activate or release the sets of resources. In this regard, the UE 115-*b* may activate or release the sets of resources based on identifying the configuration for communications between the UE 115-*b* and the base station 105-*b* at 405, transmitting the UE capability message at 410, receiving the RRC message at 415, receiving the DCI message at 425, determining the DCI message controls the sets of resources at 430, determining the DCI message activates or receives resources at 435, identifying the sets of resources to be activated or released at 440, or any combination thereof. In some aspects, the UE 115-*b* may activate the sets of resources by communicating over the sets of resources. Conversely, the UE 115-*b* may release the sets of resources by refraining from using the sets of resources. In some aspects, the UE 115-*b* may transmit an uplink transmission (e.g., acknowledgement message) to the base station 105-*b* indicating that the sets of resources have been activated or released.

At 450, the UE 115-*b*, the base station 105-*b*, or both, may determine that the sets of resources are activated or released. In some aspects, the UE 115-*b*, the base station 105-*b*, or both, may determine that the sets of resources are released based on identifying the configuration for communications between the UE 115-*b* and the base station 105-*b* at 405, transmitting the UE capability message at 410, receiving the RRC message at 415, receiving the DCI message at 425, determining the DCI message controls the sets of resources at 430, determining the DCI message activates or receives resources at 435, identifying the sets of resources to be activated or released at 440, activating or releasing the sets of resources at 445, or any combination thereof.

Techniques described herein may enable multiple a single DCI message to release multiple sets of resources within and/or across multiple component carriers. For example, techniques described herein may enable a single DCI message to release a first set of resources (e.g., SPS grant, CG grant) within a first component carrier at the UE 115, and release a second set of resources (e.g., SPS grant, CG grant) within a second component carrier at the UE 115. By enabling the release of multiple sets of resources within and/or across multiple component carriers, control signaling overhead within the wireless communications system 100 and 200 may be reduced, and flexibility of releasing sets of resources may be improved.

Figure 5:
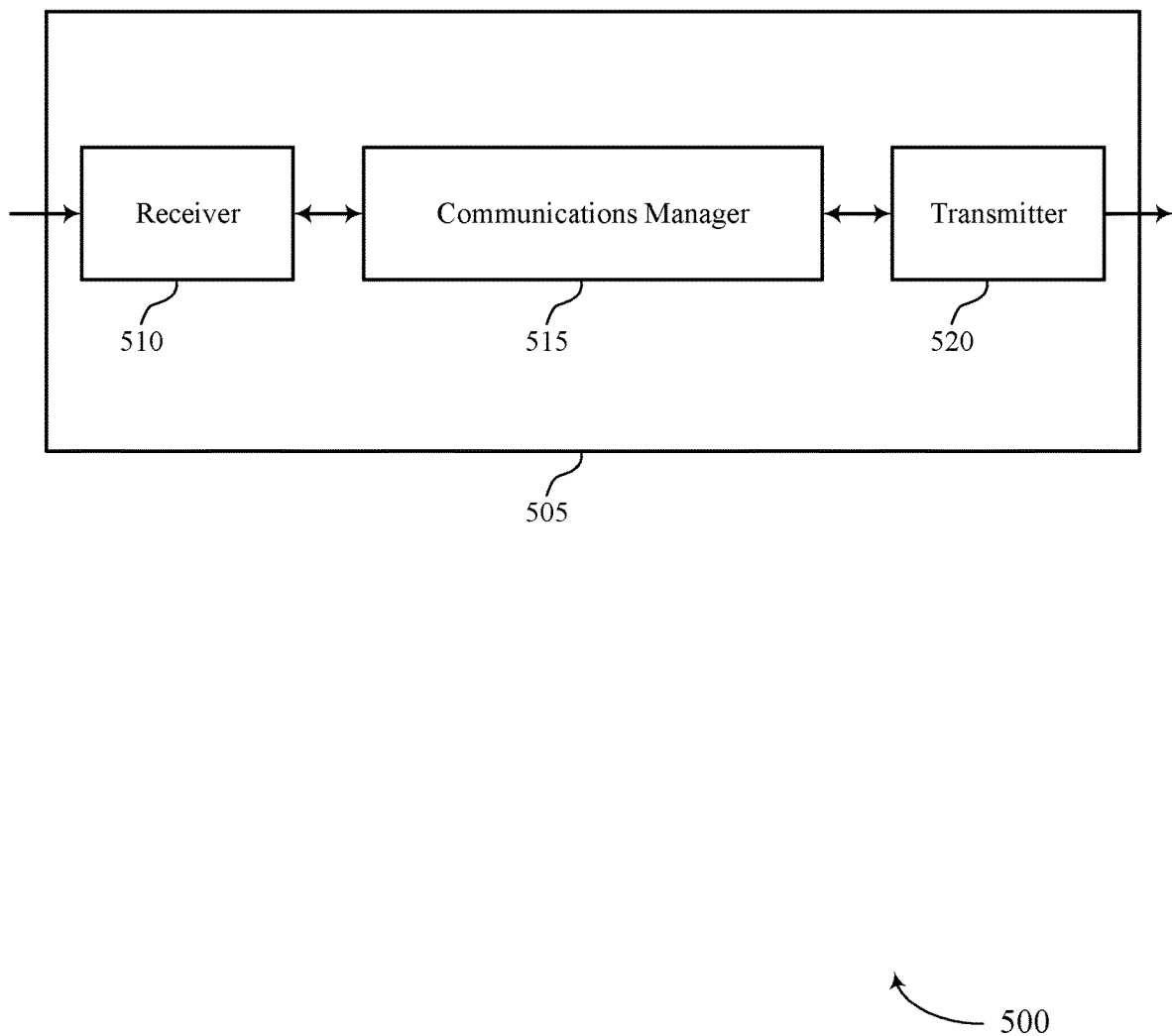
FIGS. 5 and 6 show block diagrams of devices that support techniques for activating and releasing resources across multiple component carriers in accordance with aspects of the present disclosure.

FIG. 5 shows a block diagram 500 of a device 505 that supports techniques for activating and releasing resources across multiple component carriers in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform activation and release of resources across multiple component carriers discussed herein. Each of these components may be in communication with one another (e.g., via one or more buses).

The receiver 510 may receive information such as packets, user data, or control information associated with various information channels (e.g., control channels, data channels, and information related to techniques for activating and releasing resources across multiple component carriers, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, receive, from the base station, a DCI message on the first component carrier, the DCI message including a DCI format that controls the set of sets of resources across the set of component carriers, and determine that the first set of resources and the second set of resources are one of activated or released based on a first indication in the DCI message. The communications manager 515 may be an example of aspects of the communications manager 810 described herein.

The actions performed by the communications manager 515 as described herein may be implemented to realize one or more potential advantages. For example, activating or releasing multiple sets of resources across multiple component carriers may reduce control signaling within a wireless communications system, thereby alleviating network overhead. Moreover, by reducing the quantity of DCI messages used to activate or release resources, power consumption of the UE 115 may be reduced.

Based on activating or releasing multiple sets of resources across multiple component carriers via a single DCI message, a processor of the UE 115 (e.g., a processor controlling the receiver 510, the communications manager 515, the transmitter 520, etc.) may reduce processing resources used for wireless communications. For example, by activating or releasing multiple sets of resources via a single DCI message, the UE 115 may reduce a number of times the processor ramps up processing power and turns on processing units to handle downlink reception of DCI messages.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
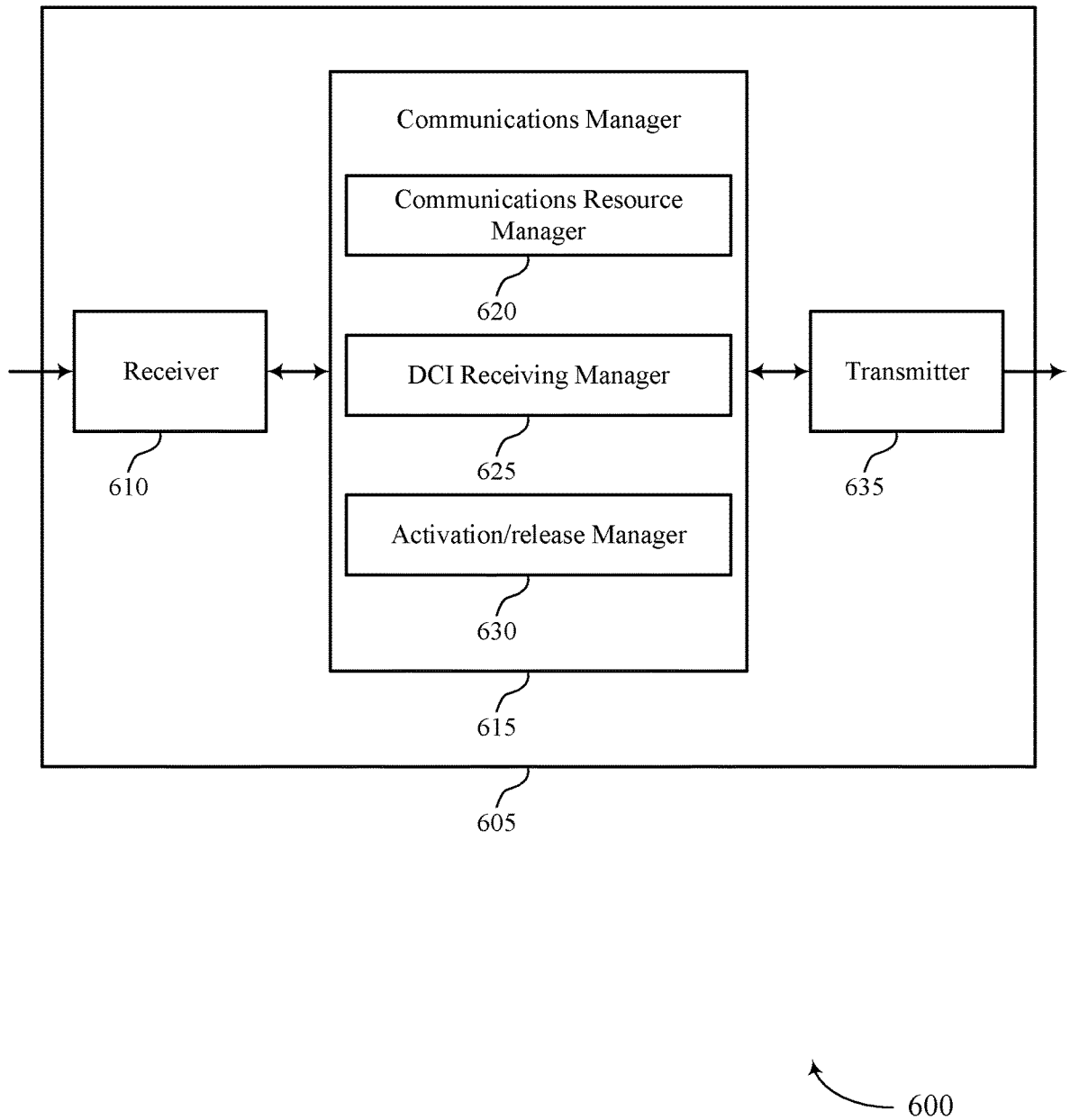

FIG. 6 shows a block diagram 600 of a device 605 that supports techniques for activating and releasing resources across multiple component carriers in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to techniques for activating and releasing resources across multiple component carriers, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a communications resource manager 620, a DCI receiving manager 625, and an activation/release manager 630. The communications manager 615 may be an example of aspects of the communications manager 810 described herein.

The communications resource manager 620 may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers.

The DCI receiving manager 625 may receive, from the base station, a DCI message on the first component carrier, the DCI message including a DCI format that controls the set of sets of resources across the set of component carriers.

The activation/release manager 630 may determine that the first set of resources and the second set of resources are one of activated or released based on a first indication in the DCI message.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some cases, the communications resource manager 620, the DCI receiving manager 625, and the activation/release manager 630 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communications resource manager 620, the DCI receiving manager 625, and the activation/release manager 630 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
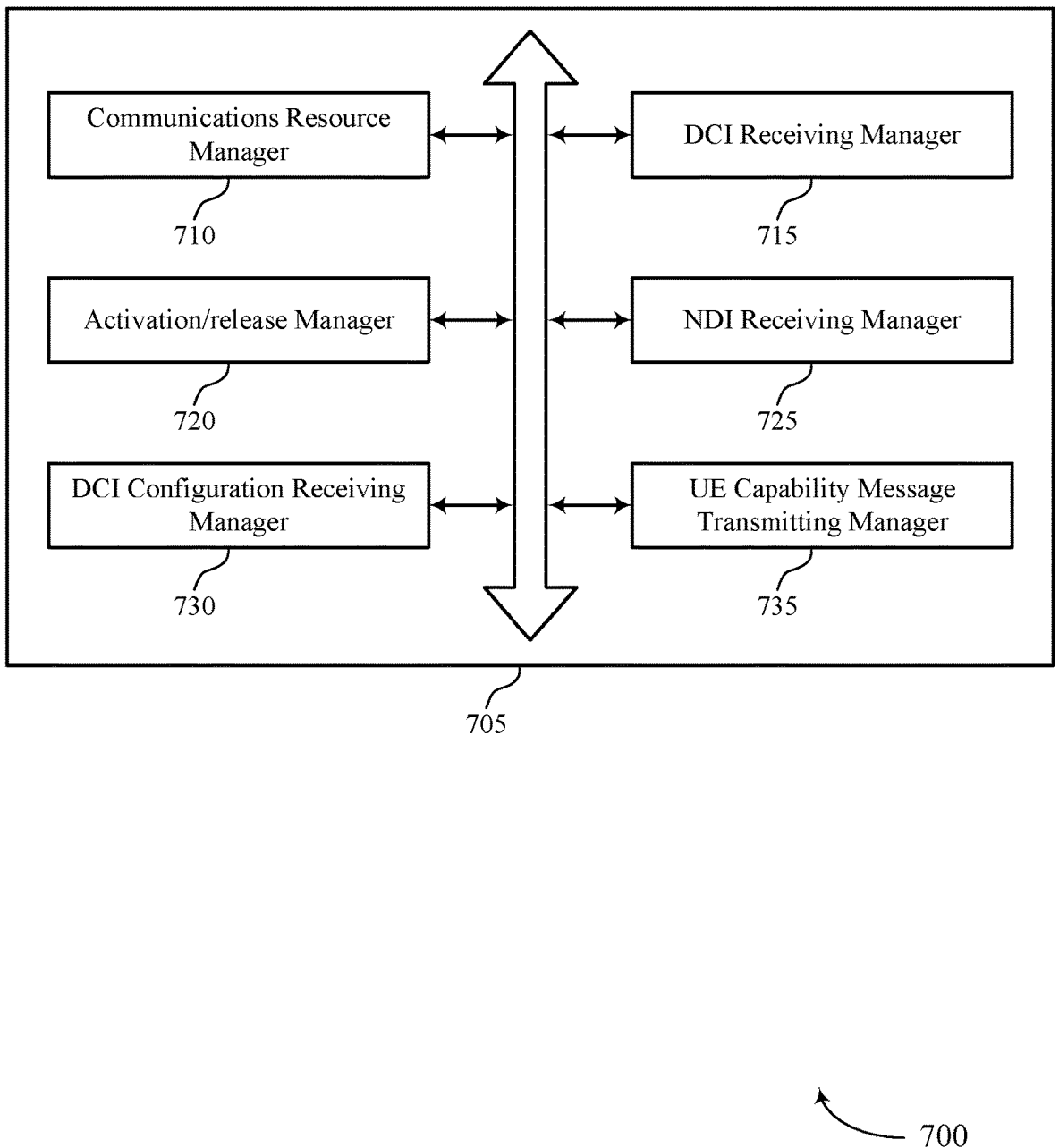
FIG. 7 shows a block diagram of a communications manager that supports techniques for activating and releasing resources across multiple component carriers in accordance with aspects of the present disclosure.

FIG. 7 shows a block diagram 700 of a communications manager 705 that supports techniques for activating and releasing resources across multiple component carriers in accordance with aspects of the present disclosure. The communications manager 705 may be an example of aspects of a communications manager 515, a communications manager 615, or a communications manager 810 described herein. The communications manager 705 may include a communications resource manager 710, a DCI receiving manager 715, an activation/release manager 720, an NDI receiving manager 725, a DCI configuration receiving manager 730, and a UE capability message transmitting manager 735. Each of these modules may communicate, directly or indirectly, with one another (e.g., via one or more buses).

The communications resource manager 710 may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers. In some cases, the first set of resources and the second set of resources include a set of downlink resources associated with a semi-persistent scheduling grant, a set of uplink resources associated with a configured grant, or a combination thereof.

The DCI receiving manager 715 may receive, from the base station, a DCI message on the first component carrier, the DCI message including a DCI format that controls the set of sets of resources across the set of component carriers. In some examples, the DCI receiving manager 715 may identify a second indication in the DCI message. In some examples, the DCI receiving manager 715 may determine that the DCI message is configurable to activate the set of sets of resources based on the second indication and the configuration for the UE to use to interpret the DCI message. In some examples, the DCI receiving manager 715 may determine that the DCI message is configured to activate the set of sets of resources based on a control resource set, a search space, or both, on which the DCI message was received.

In some examples, the DCI receiving manager 715 may determine that the DCI message controls the set of sets of resources based on determining that at least a portion of the DCI message is scrambled according to a configured scheduling radio network temporary identifier, where determining that the first set of resources and the second set of resources are one of activated or released is based on determining that at least a portion of the DCI message is scrambled according to the configured scheduling radio network temporary identifier. In some cases, the second indication in the DCI message includes a value of a carrier indicator field. In some cases, the DCI format of the received DCI message is configurable by the base station to perform one of scheduling, activating, or releasing resources on the set of component carriers.

The activation/release manager 720 may determine that the first set of resources and the second set of resources are one of activated or released based on a first indication in the DCI message. In some examples, determining whether a first RV field of the received DCI message includes a first value associated with activation or release of the set of sets of resources or a second value associated with scheduling of the set of sets of resources. In some cases, the first indication includes an RV field, an MCS field, an FDRA field, or any combination thereof. In some cases, the first indication includes a combination of the RV field, the MCS field, and the FDRA field.

The NDI receiving manager 725 may receive a first NDI field of the DCI message, where determining that the first set of resources is the one of activated or released is based on a value of the first NDI field. In some examples, the NDI receiving manager 725 may receive a second NDI field of the DCI message, where the first NDI field of the DCI message is associated with the first component carrier, the second NDI field of the DCI message is associated with the second component carrier, and determining that the second set of resources is one of activated or released is based on a value of the second NDI field. In some cases, the first NDI field of the DCI message is associated with the first component carrier and the second component carrier, and determining that the second set of resources is the one of activated or released is based on the value of the first NDI field.

The DCI configuration receiving manager 730 may receive, from the base station, a configuration for the UE to use to interpret the DCI message, where determining that the first set of resources and the second set of resources are one of activated or released is based on the received configuration.

The UE capability message transmitting manager 735 may transmit, to the base station, a UE capability message indicating that the UE is configured to release two or more sets of resources via a single DCI message, where receiving the DCI message is based on transmitting the UE capability message.

In some cases, the communications resource manager 710, the DCI receiving manager 715, the activation/release manager 720, the NDI receiving manager 725, the DCI configuration receiving manager 730, and the UE capability message transmitting manager 735 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communications resource manager 710, the DCI receiving manager 715, the activation/release manager 720, the NDI receiving manager 725, the DCI configuration receiving manager 730, and the UE capability message transmitting manager 735 discussed herein.

Figure 8:
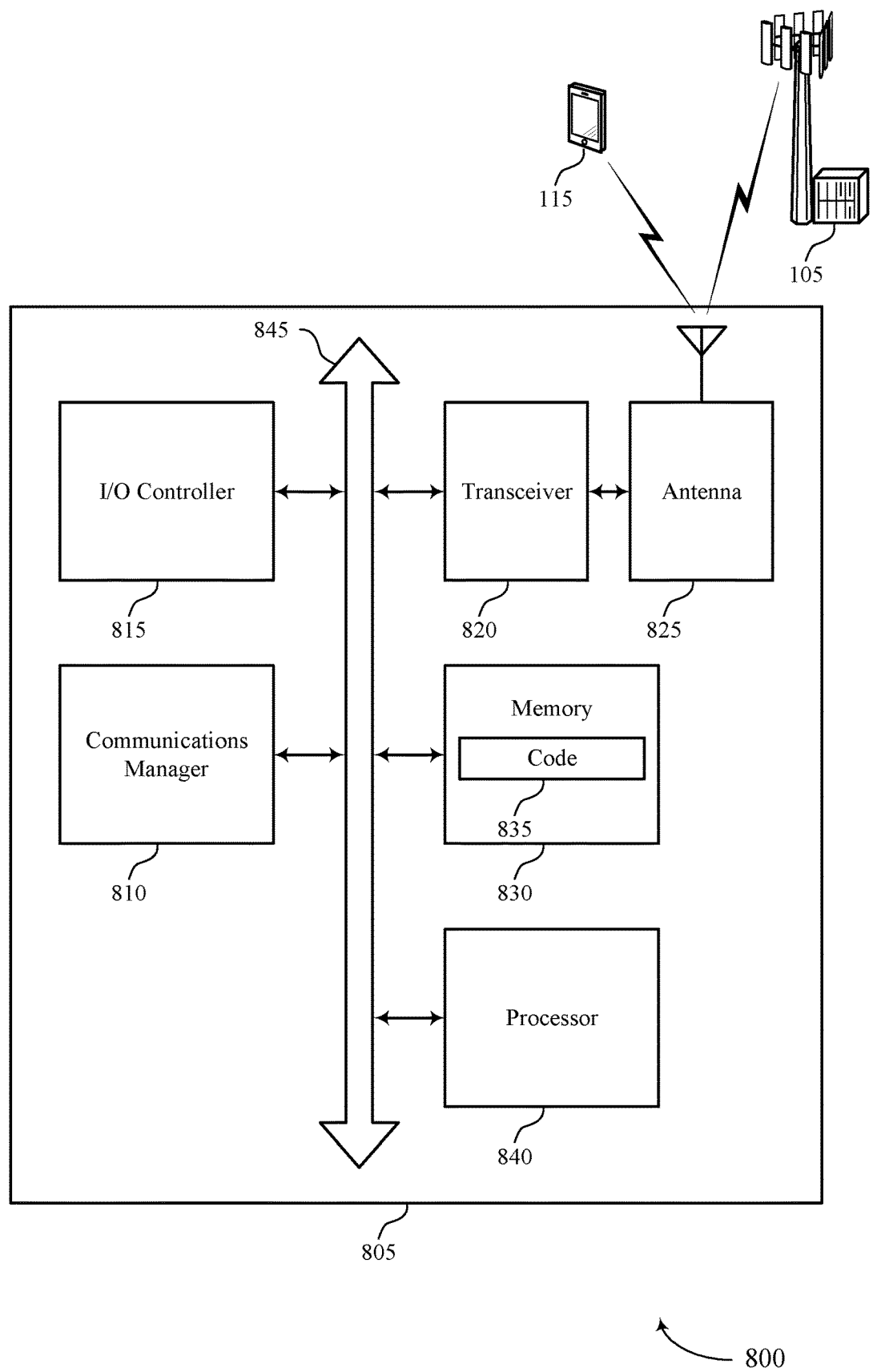
FIG. 8 shows a diagram of a system including a device that supports techniques for activating and releasing resources across multiple component carriers in accordance with aspects of the present disclosure.

FIG. 8 shows a diagram of a system 800 including a device 805 that supports techniques for activating and releasing resources across multiple component carriers in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, receive, from the base station, a DCI message on the first component carrier, the DCI message including a DCI format that controls the set of sets of resources across the set of component carriers, and determine that the first set of resources and the second set of resources are one of activated or released based on a first indication in the DCI message.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for activating and releasing resources across multiple component carriers).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
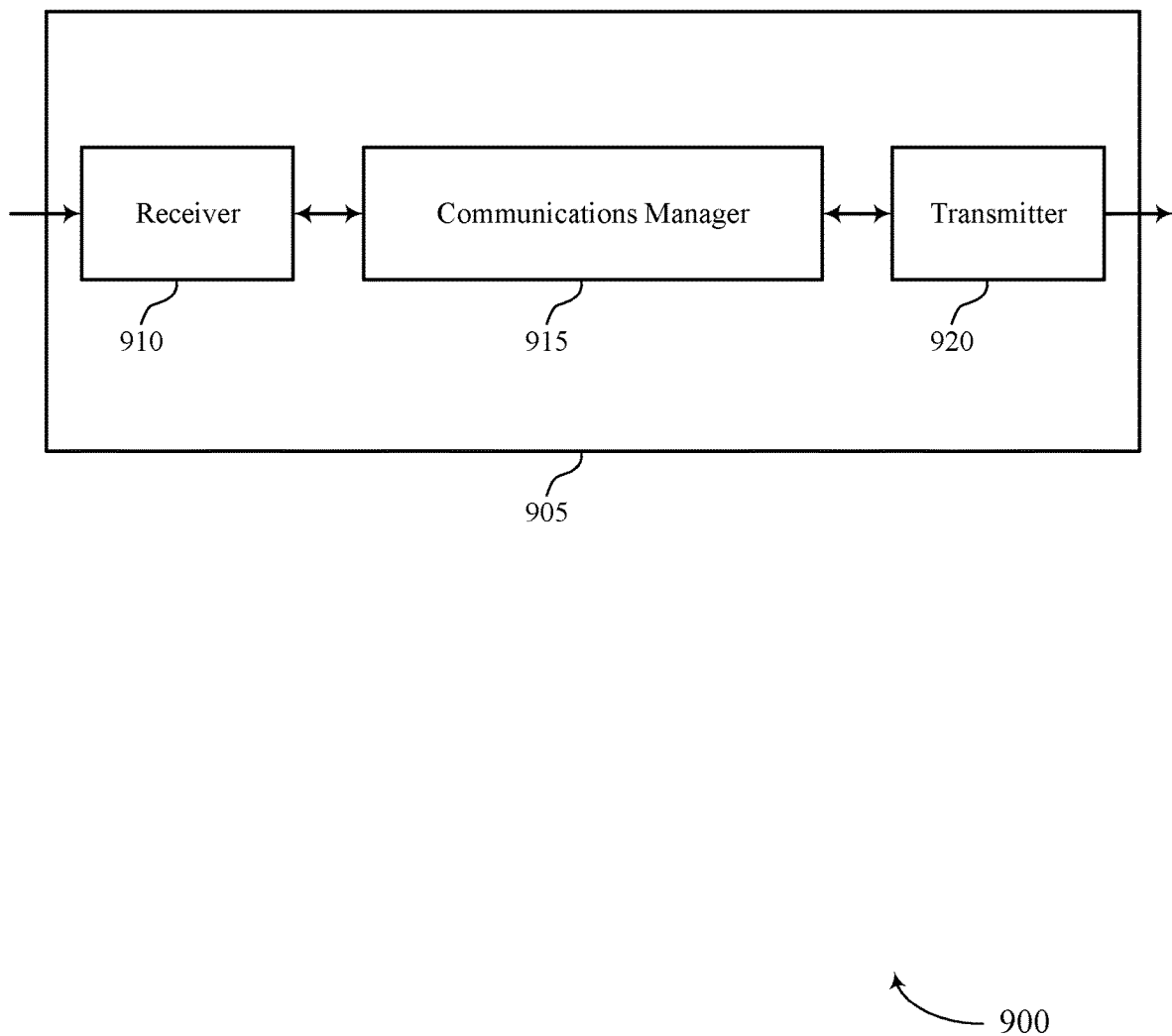
FIGS. 9 and 10 show block diagrams of devices that support techniques for activating and releasing resources across multiple component carriers in accordance with aspects of the present disclosure.

FIG. 9 shows a block diagram 900 of a device 905 that supports techniques for activating and releasing resources across multiple component carriers in accordance with aspects of the present disclosure. The device 905 may be an example of aspects of a base station 105 as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform activation and release of resources across multiple component carriers discussed herein. Each of these components may be in communication with one another (e.g., via one or more buses).

The receiver 910 may receive information such as packets, user data, or control information associated with various information channels (e.g., control channels, data channels, and information related to techniques for activating and releasing resources across multiple component carriers, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, determine that the first set of resources and the second set of resources are to be one of activated or released, and transmit, to the UE on the first component carrier, a DCI message that includes a first indication indicating that the first set of resources and the second set of resources are to be the one of activated or released, the DCI message including a DCI format that controls the set of sets of resources across the set of component carriers. The communications manager 915 may be an example of aspects of the communications manager 1210 described herein.

The actions performed by the communications manager 915 as described herein may be implemented to realize one or more potential advantages. For example, activating or releasing multiple sets of resources across multiple component carriers may reduce control signaling within a wireless communications system, thereby alleviating network overhead. Moreover, by reducing the quantity of DCI messages used to activate or release resources, power consumption of the base station 105 may be reduced.

Based on activating or releasing multiple sets of resources across multiple component carriers via a single DCI message, a processor of the base station 105 (e.g., a processor controlling the receiver 910, the communications manager 915, the transmitter 920, etc.) may reduce processing resources used for wireless communications. For example, by activating or releasing multiple sets of resources via a single DCI message, the base station 105 may reduce a number of times the processor ramps up processing power and turns on processing units to handle downlink reception of DCI messages.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
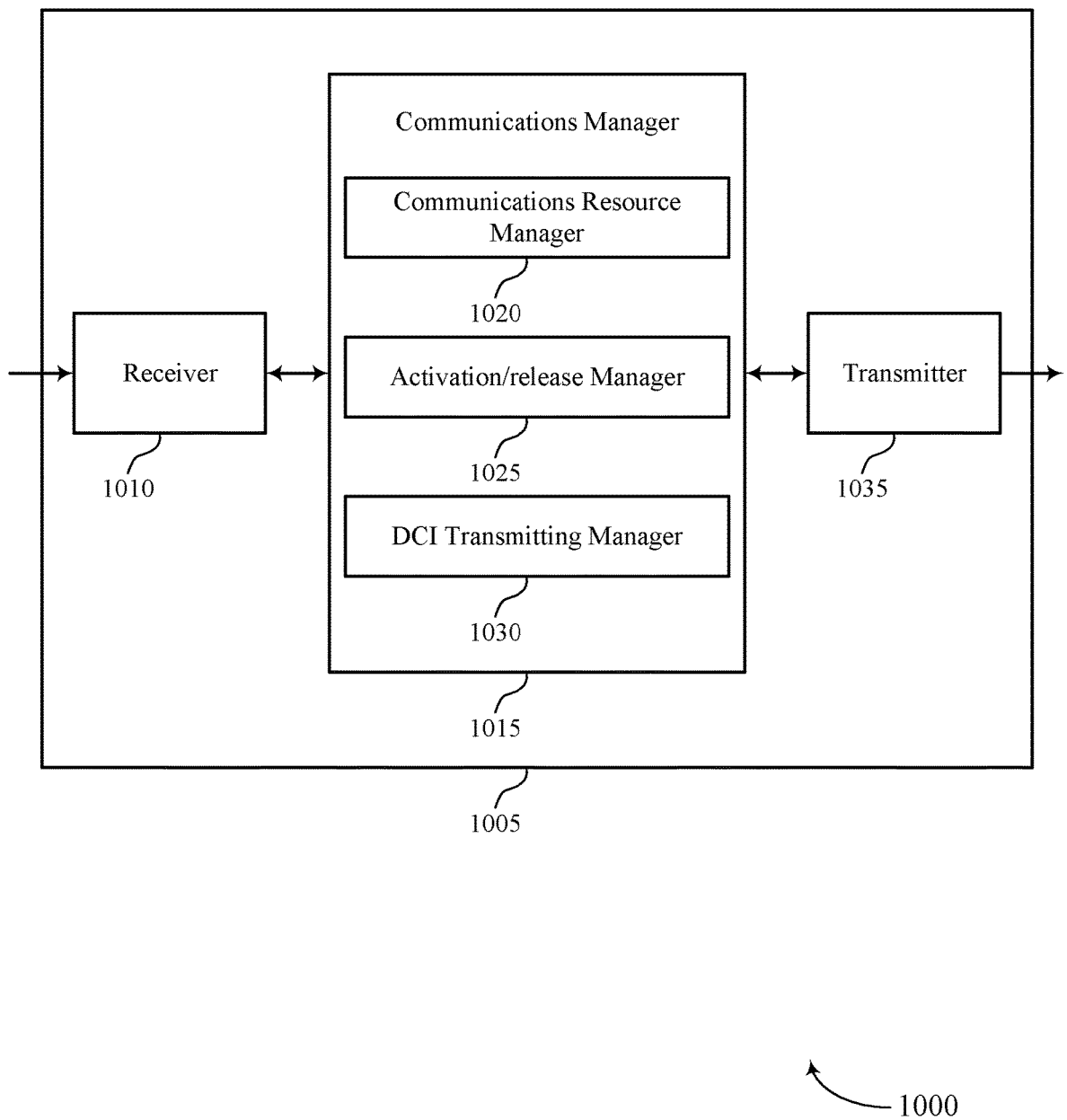

FIG. 10 shows a block diagram 1000 of a device 1005 that supports techniques for activating and releasing resources across multiple component carriers in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for activating and releasing resources across multiple component carriers, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communications resource manager 1020, an activation/release manager 1025, and a DCI transmitting manager 1030. The communications manager 1015 may be an example of aspects of the communications manager 1210 described herein.

The communications resource manager 1020 may identify a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers.

The activation/release manager 1025 may determine that the first set of resources and the second set of resources are to be one of activated or released.

The DCI transmitting manager 1030 may transmit, to the UE on the first component carrier, a DCI message that includes a first indication indicating that the first set of resources and the second set of resources are to be the one of activated or released, the DCI message including a DCI format that controls the set of sets of resources across the set of component carriers.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

In some cases, the communications resource manager 1020, the activation/release manager 1025, and the DCI transmitting manager 1030 and may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communications resource manager 1020, the activation/release manager 1025, and the DCI transmitting manager 1030 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
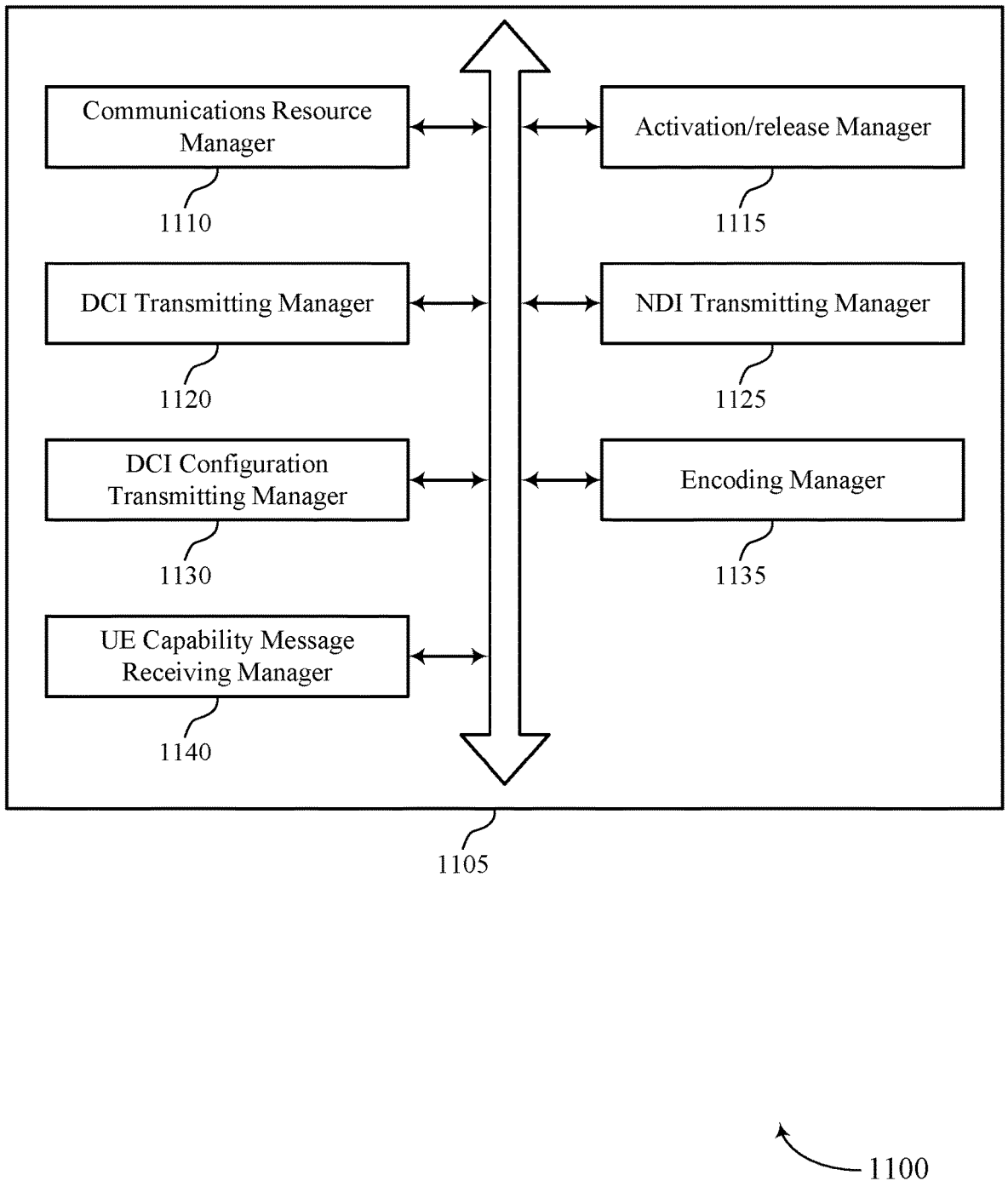
FIG. 11 shows a block diagram of a communications manager that supports techniques for activating and releasing resources across multiple component carriers in accordance with aspects of the present disclosure.

FIG. 11 shows a block diagram 1100 of a communications manager 1105 that supports techniques for activating and releasing resources across multiple component carriers in accordance with aspects of the present disclosure. The communications manager 1105 may be an example of aspects of a communications manager 915, a communications manager 1015, or a communications manager 1210 described herein. The communications manager 1105 may include a communications resource manager 1110, an activation/release manager 1115, a DCI transmitting manager 1120, an NDI transmitting manager 1125, a DCI configuration transmitting manager 1130, an encoding manager 1135, and a UE capability message receiving manager 1140. Each of these modules may communicate, directly or indirectly, with one another (e.g., via one or more buses).

The communications resource manager 1110 may identify a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers. In some cases, the first set of resources and the second set of resources include a set of downlink resources associated with a semi-persistent scheduling grant, a set of uplink resources associated with a configured grant, or a combination thereof.

The activation/release manager 1115 may determine that the first set of resources and the second set of resources are to be one of activated or released. In some examples, the activation/release manager 1115 may determine that the DCI message is configurable to activate the set of sets of resources based on the second indication and the configuration for the UE to use to interpret the DCI message. In some examples, the activation/release manager 1115 may determine that the DCI message is configured to activate the set of sets of resources based on a control resource set, a search space, or both, on which the DCI message was transmitted. In some cases, the first indication includes an RV field, an MCS field, an FDRA field, or any combination thereof. In some cases, the first indication includes a combination of the RV field, the MCS field, and the FDRA field.

The DCI transmitting manager 1120 may transmit, to the UE on the first component carrier, a DCI message that includes a first indication indicating that the first set of resources and the second set of resources are to be the one of activated or released, the DCI message including a DCI format that controls the set of sets of resources across the set of component carriers. In some examples, the DCI transmitting manager 1120 may transmit, to the UE, a second indication in the DCI message. In some cases, the DCI message indicates that the second set of resources is the one of activated or released further based on a first value of a first RV field of the transmitted DCI message, the first value of the first RV field associated with activation or release of the set of sets of resources, and a second value of the first RV field associated with scheduling of the set of sets of resources. In some cases, the second indication in the DCI message includes a value of a carrier indicator field. In some cases, the DCI format of the received DCI message is configurable by the base station to perform one of scheduling, activating, or releasing resources on the set of component carriers.

The NDI transmitting manager 1125 may transmit a first NDI field of the DCI message, where the DCI message indicates that the first set of resources is the one of activated or released based on a value of the first NDI field. In some examples, the NDI transmitting manager 1125 may transmit a second NDI field of the DCI message, where the first NDI field of the DCI message is associated with the first component carrier, the second NDI field of the DCI message is associated with the second component carrier, and the DCI message indicates that the second set of resources is the one of activated or released based on the value of the second NDI field. In some cases, the first NDI field of the DCI message is associated with the first component carrier and the second component carrier, and the DCI message indicates that the second set of resources is the one of activated or released based on the value of the first NDI field.

The DCI configuration transmitting manager 1130 may transmit, to the UE, a configuration for the UE to use to interpret the DCI message, where determining that the first set of resources and the second set of resources are one of activated or released is based on the transmitted configuration.

The encoding manager 1135 may encode, according to a configured scheduling radio network temporary identifier, at least a portion of the DCI message to indicate that the first set of resources and the second set of resources are to be the one of activated or released.

The UE capability message receiving manager 1140 may receive, from the UE, a UE capability message indicating that the UE is configured to release two or more sets of resources via a single DCI message, where transmitting the DCI message is based on receiving the UE capability message.

In some cases, the communication resource manager 1110, the activation/release manager 1115, the DCI transmitting manager 1120, the NDI transmitting manager 1125, the DCI configuration transmitting manager 1130, the encoding manager 1135, and the UE capability message receiving manager 1140 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communication resource manager 1110, the activation/release manager 1115, the DCI transmitting manager 1120, the NDI transmitting manager 1125, the DCI configuration transmitting manager 1130, the encoding manager 1135, and the UE capability message receiving manager 1140 discussed herein.

Figure 12:
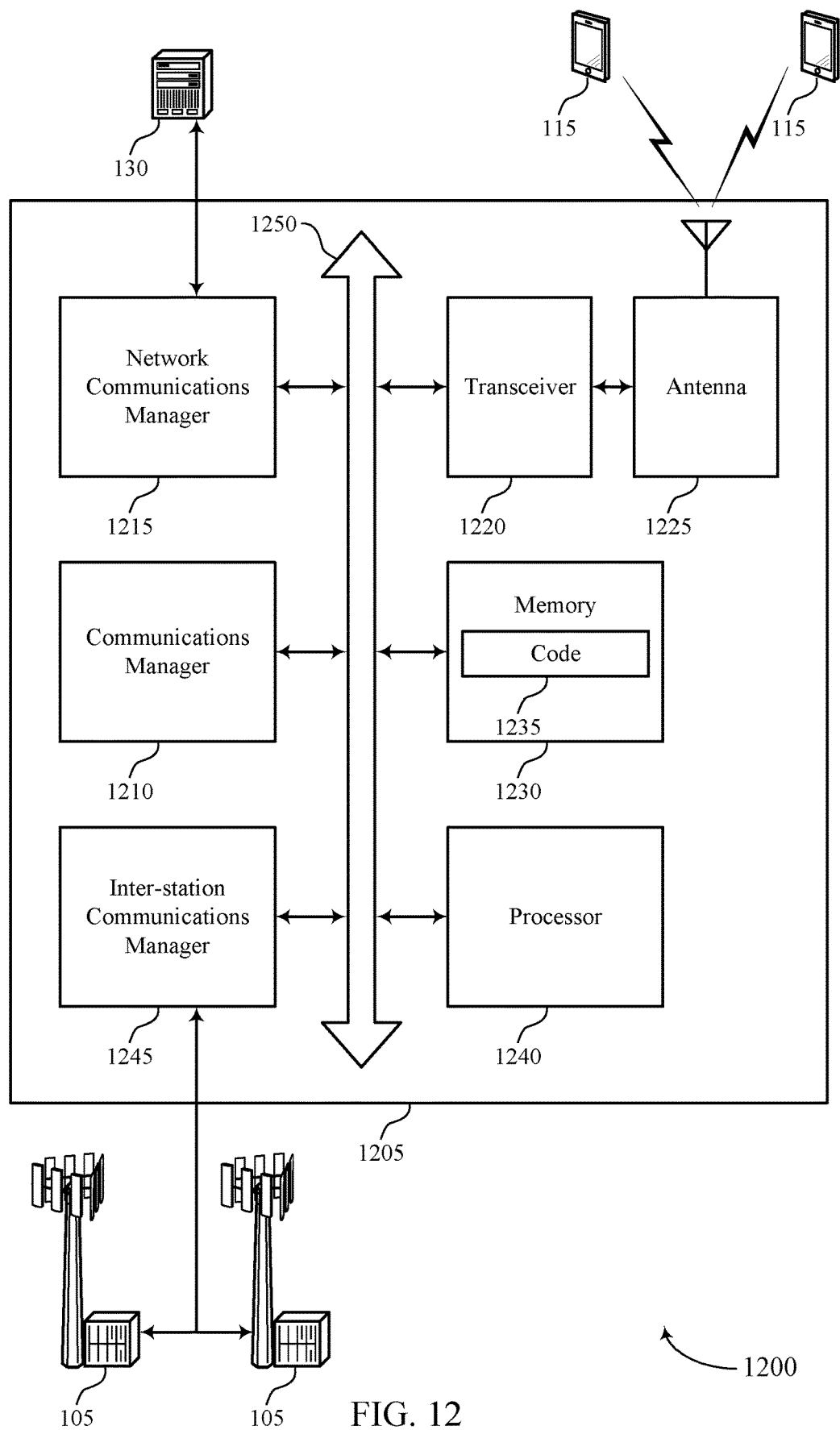
FIG. 12 shows a diagram of a system including a device that supports techniques for activating and releasing resources across multiple component carriers in accordance with aspects of the present disclosure.

FIG. 12 shows a diagram of a system 1200 including a device 1205 that supports techniques for activating and releasing resources across multiple component carriers in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers, determine that the first set of resources and the second set of resources are to be one of activated or released, and transmit, to the UE on the first component carrier, a DCI message that includes a first indication indicating that the first set of resources and the second set of resources are to be the one of activated or released, the DCI message including a DCI format that controls the set of sets of resources across the set of component carriers.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for activating and releasing resources across multiple component carriers).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
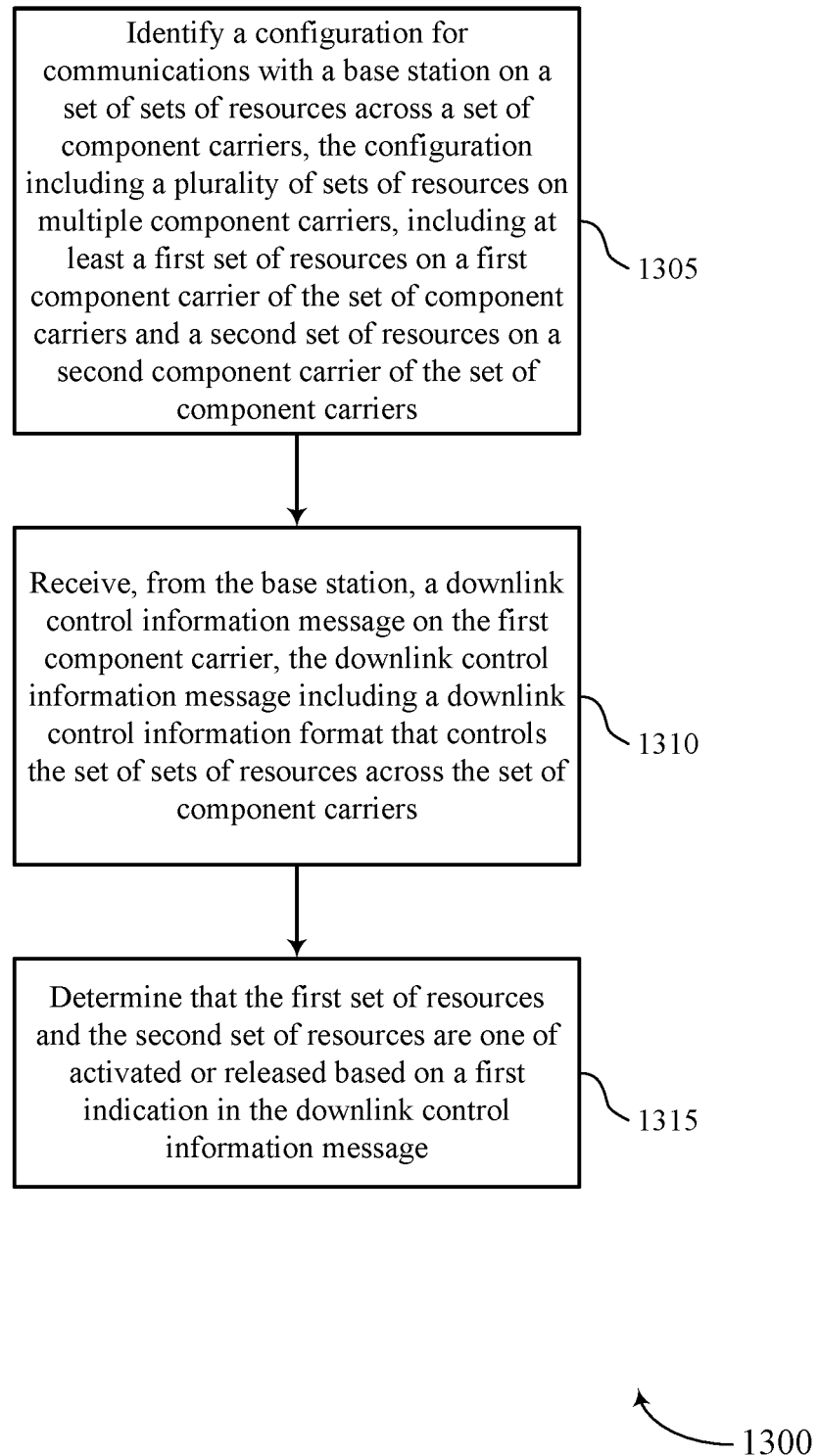
FIGS. 13 through 17 show flowcharts illustrating methods that support techniques for activating and releasing resources across multiple component carriers in accordance with aspects of the present disclosure.

FIG. 13 shows a flowchart illustrating a method 1300 that supports techniques for activating and releasing resources across multiple component carriers in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers. The operations of 1305 may be performed according to the methods described herein. In some examples, aspects of the operations of 1305 may be performed by a communications resource manager as described with reference to FIGS. 5 through 8.

At 1310, the UE may receive, from the base station, a DCI message on the first component carrier, the DCI message including a DCI format that controls the set of sets of resources across the set of component carriers. The operations of 1310 may be performed according to the methods described herein. In some examples, aspects of the operations of 1310 may be performed by a DCI receiving manager as described with reference to FIGS. 5 through 8.

At 1315, the UE may determine that the first set of resources and the second set of resources are one of activated or released based on a first indication in the DCI message. The operations of 1315 may be performed according to the methods described herein. In some examples, aspects of the operations of 1315 may be performed by an activation/release manager as described with reference to FIGS. 5 through 8.

Figure 14:
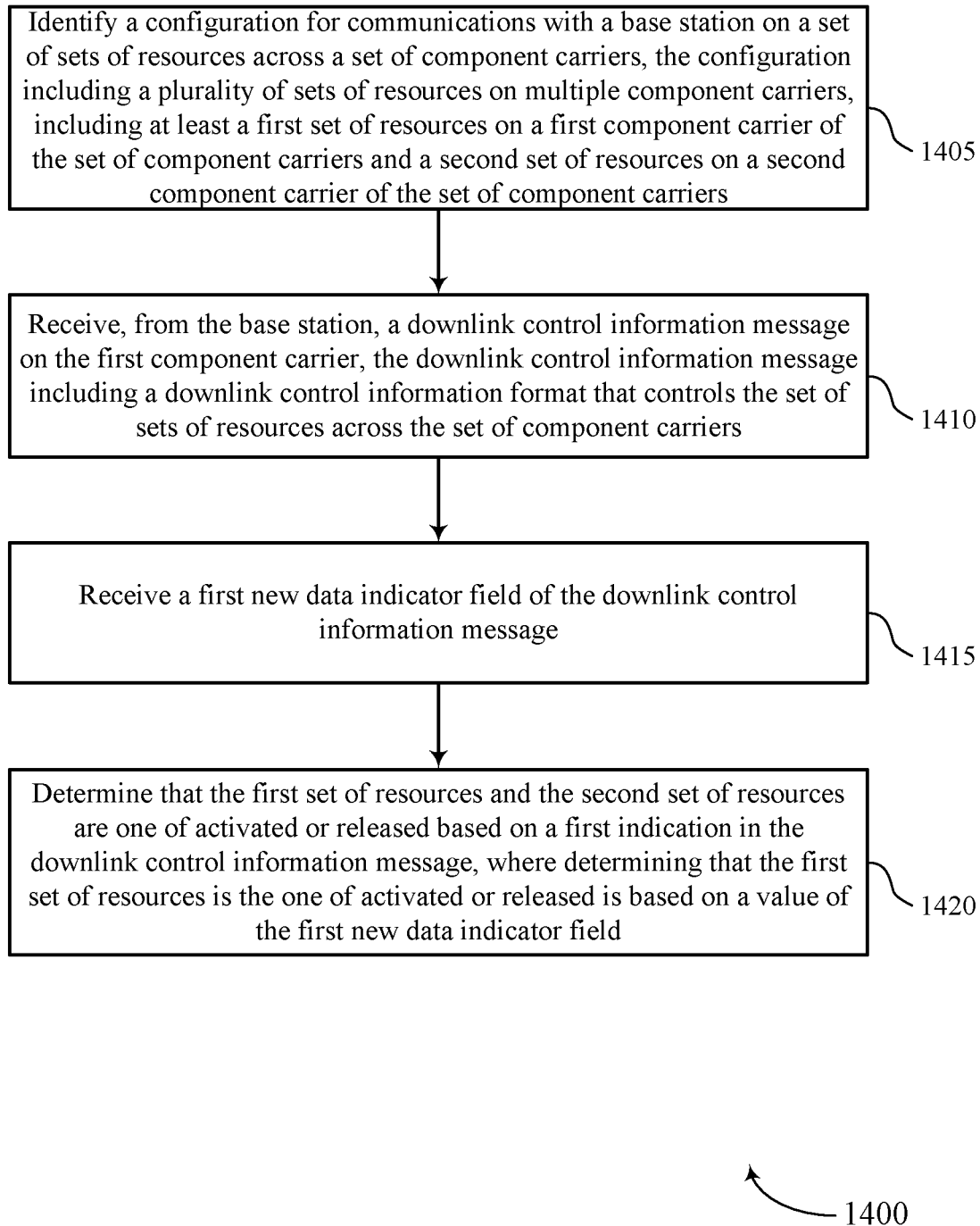

FIG. 14 shows a flowchart illustrating a method 1400 that supports techniques for activating and releasing resources across multiple component carriers in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers. The operations of 1405 may be performed according to the methods described herein. In some examples, aspects of the operations of 1405 may be performed by a communications resource manager as described with reference to FIGS. 5 through 8.

At 1410, the UE may receive, from the base station, a DCI message on the first component carrier, the DCI message including a DCI format that controls the set of sets of resources across the set of component carriers. The operations of 1410 may be performed according to the methods described herein. In some examples, aspects of the operations of 1410 may be performed by a DCI receiving manager as described with reference to FIGS. 5 through 8.

At 1415, the UE may receive a first NDI field of the DCI message. The operations of 1415 may be performed according to the methods described herein. In some examples, aspects of the operations of 1415 may be performed by an NDI receiving manager as described with reference to FIGS. 5 through 8.

At 1420, the UE may determine that the first set of resources and the second set of resources are one of activated or released based on a first indication in the DCI message, where determining that the first set of resources is the one of activated or released is based on a value of the first NDI field. The operations of 1420 may be performed according to the methods described herein. In some examples, aspects of the operations of 1420 may be performed by an activation/release manager as described with reference to FIGS. 5 through 8.

Figure 15:
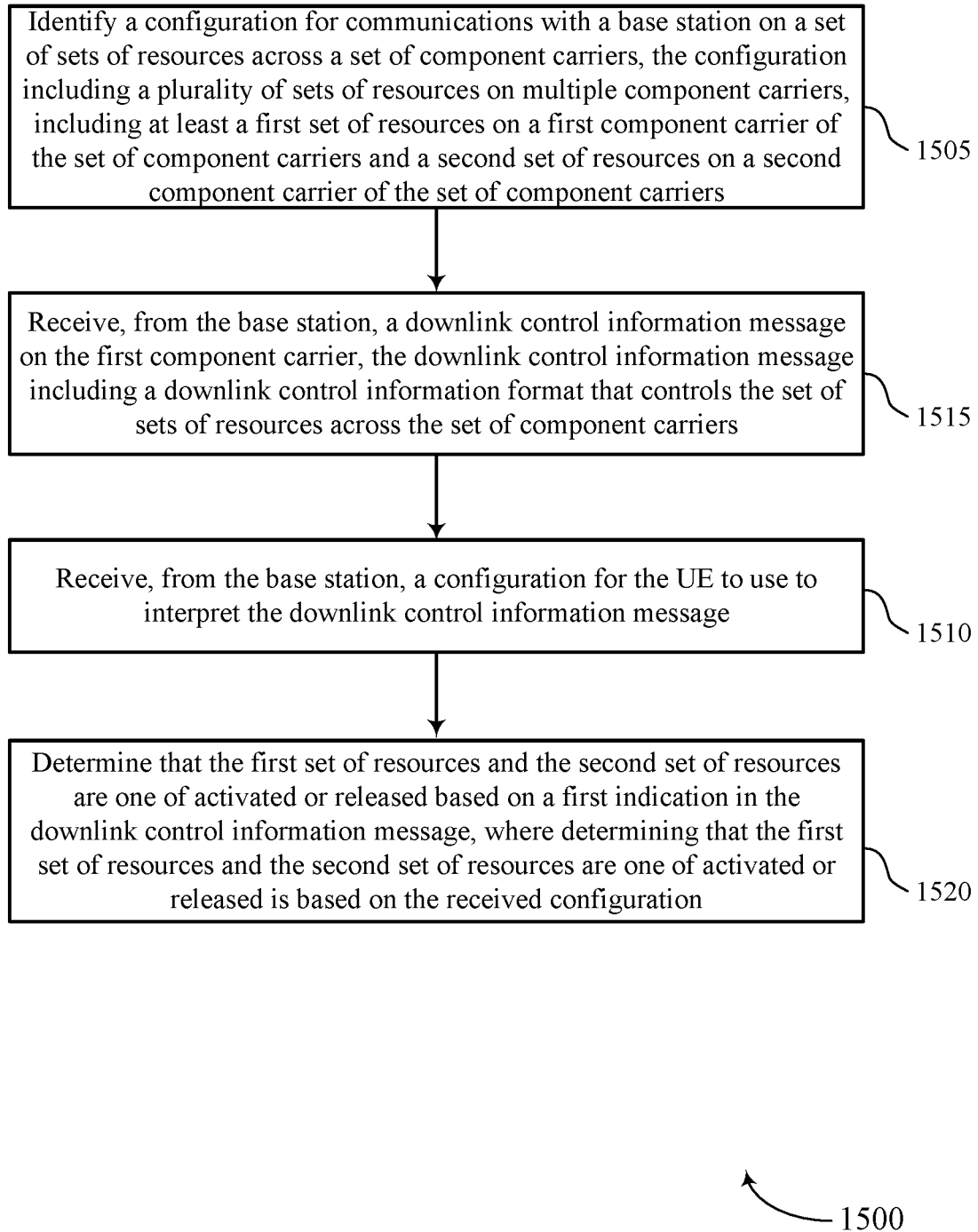

FIG. 15 shows a flowchart illustrating a method 1500 that supports techniques for activating and releasing resources across multiple component carriers in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers. The operations of 1505 may be performed according to the methods described herein. In some examples, aspects of the operations of 1505 may be performed by a communications resource manager as described with reference to FIGS. 5 through 8.

At 1510, the UE may receive, from the base station, a DCI message on the first component carrier, the DCI message including a DCI format that controls the set of sets of resources across the set of component carriers. The operations of 1510 may be performed according to the methods described herein. In some examples, aspects of the operations of 1510 may be performed by a DCI receiving manager as described with reference to FIGS. 5 through 8.

At 1515, the UE may receive, from the base station, a configuration for the UE to use to interpret the DCI message. The operations of 1515 may be performed according to the methods described herein. In some examples, aspects of the operations of 1515 may be performed by a DCI configuration receiving manager as described with reference to FIGS. 5 through 8.

At 1520, the UE may determine that the first set of resources and the second set of resources are one of activated or released based on a first indication in the DCI message, where determining that the first set of resources and the second set of resources are one of activated or released is based on the received configuration. The operations of 1520 may be performed according to the methods described herein. In some examples, aspects of the operations of 1520 may be performed by an activation/release manager as described with reference to FIGS. 5 through 8.

Figure 16:
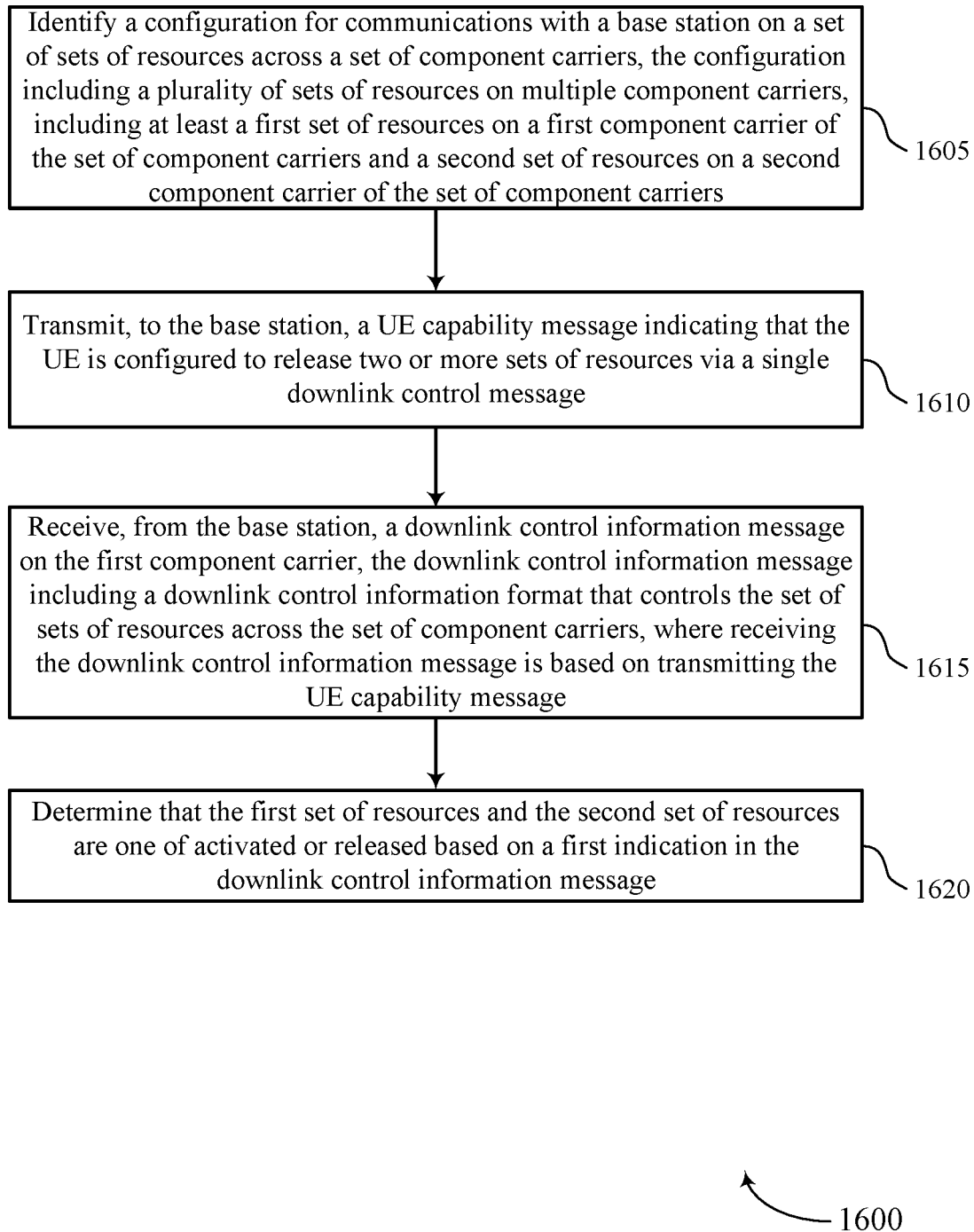

FIG. 16 shows a flowchart illustrating a method 1600 that supports techniques for activating and releasing resources across multiple component carriers in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify a configuration for communications with a base station on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers. The operations of 1605 may be performed according to the methods described herein. In some examples, aspects of the operations of 1605 may be performed by a communications resource manager as described with reference to FIGS. 5 through 8.

At 1610, the UE may transmit, to the base station, a UE capability message indicating that the UE is configured to release two or more sets of resources via a single DCI message. The operations of 1610 may be performed according to the methods described herein. In some examples, aspects of the operations of 1610 may be performed by a UE capability message transmitting manager as described with reference to FIGS. 5 through 8.

At 1615, the UE may receive, from the base station, a DCI message on the first component carrier, the DCI message including a DCI format that controls the set of sets of resources across the set of component carriers, where receiving the DCI message is based on transmitting the UE capability message. The operations of 1615 may be performed according to the methods described herein. In some examples, aspects of the operations of 1615 may be performed by a DCI receiving manager as described with reference to FIGS. 5 through 8.

At 1620, the UE may determine that the first set of resources and the second set of resources are one of activated or released based on a first indication in the DCI message. The operations of 1620 may be performed according to the methods described herein. In some examples, aspects of the operations of 1620 may be performed by an activation/release manager as described with reference to FIGS. 5 through 8.

Figure 17:
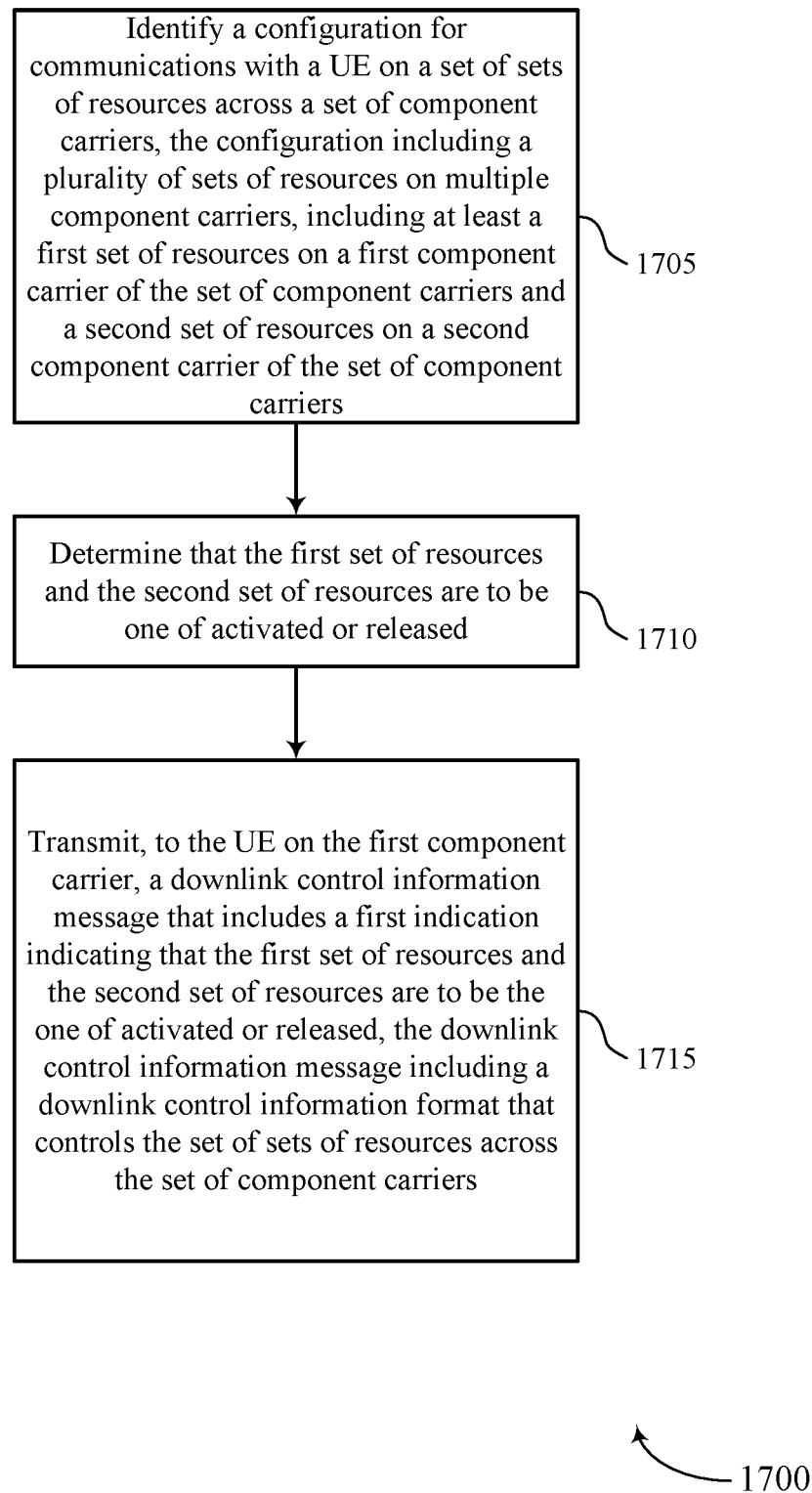

FIG. 17 shows a flowchart illustrating a method 1700 that supports techniques for activating and releasing resources across multiple component carriers in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a configuration for communications with a UE on a set of sets of resources across a set of component carriers, the configuration including at least a plurality of sets of resources on multiple component carriers, including at least a first set of resources on a first component carrier of the set of component carriers and a second set of resources on a second component carrier of the set of component carriers. The operations of 1705 may be performed according to the methods described herein. In some examples, aspects of the operations of 1705 may be performed by a communications resource manager as described with reference to FIGS. 9 through 12.

At 1710, the base station may determine that the first set of resources and the second set of resources are to be one of activated or released. The operations of 1710 may be performed according to the methods described herein. In some examples, aspects of the operations of 1710 may be performed by an activation/release manager as described with reference to FIGS. 9 through 12.

At 1715, the base station may transmit, to the UE on the first component carrier, a DCI message that includes a first indication indicating that the first set of resources and the second set of resources are to be the one of activated or released, the DCI message including a DCI format that controls the set of sets of resources across the set of component carriers. The operations of 1715 may be performed according to the methods described herein. In some examples, aspects of the operations of 1715 may be performed by a DCI transmitting manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying a configuration for communications with a base station on a plurality of sets of resources across a plurality of component carriers, the configuration including at least a plurality of sets of resources on multiple component carriers, including at least a first set of resources on a first component carrier of the plurality of component carriers and a second set of resources on a second component carrier of the plurality of component carriers; receiving, from the base station, a downlink control information message on the first component carrier, the downlink control information message comprising a downlink control information format that controls the plurality of sets of resources across the plurality of component carriers; and determining that the first set of resources and the second set of resources are one of activated or released based at least in part on a first indication in the downlink control information message.

Aspect 2: The method of aspect 1, wherein the first indication comprises a redundancy version field, a modulation and coding scheme field, a frequency domain resource assignment field, or any combination thereof.

Aspect 3: The method of aspect 2, wherein the first indication comprises a combination of the redundancy version field, the modulation and coding scheme field, and the frequency domain resource assignment field.

Aspect 4: The method of any of aspects 1 through 3, further comprising: receiving a first new data indicator field of the downlink control information message, wherein determining that the first set of resources is the one of activated or released is based at least in part on a value of the first new data indicator field.

Aspect 5: The method of aspect 4, wherein the first new data indicator field of the downlink control information message is associated with the first component carrier and the second component carrier, and determining that the second set of resources is the one of activated or released is based at least in part on the value of the first new data indicator field.

Aspect 6: The method of any of aspects 4 through 5, further comprising: receiving a second new data indicator field of the downlink control information message, wherein the first new data indicator field of the downlink control information message is associated with the first component carrier, the second new data indicator field of the downlink control information message is associated with the second component carrier, and determining that the second set of resources is one of activated or released is based at least in part on a value of the second new data indicator field.

Aspect 7: The method of any of aspects 1 through 6, wherein determining that the first set of resources and the second set of resources are one of activated or released further comprises: determining whether a first redundancy version field of the received downlink control information message comprises a first value associated with activation or release of the plurality of sets of resources or a second value associated with scheduling of the plurality of sets of resources.

Aspect 8: The method of any of aspects 1 through 7, further comprising: receiving, from the base station, a configuration for the UE to use to interpret the downlink control information message, wherein determining that the first set of resources and the second set of resources are one of activated or released is based at least in part on the received configuration.

Aspect 9: The method of aspect 8, further comprising: identifying a second indication in the downlink control information message; and determining that the downlink control information message is configurable to activate the plurality of sets of resources based at least in part on the second indication and the configuration for the UE to use to interpret the downlink control information message.

Aspect 10: The method of aspect 9, wherein the second indication in the downlink control information message comprises a value of a carrier indicator field.

Aspect 11: The method of any of aspects 1 through 10, further comprising: determining that the downlink control information message is configured to activate the plurality of sets of resources based at least in part on a control resource set, a search space, or both, on which the downlink control information message was received.

Aspect 12: The method of any of aspects 1 through 11, further comprising: determining that the downlink control information message controls the plurality of sets of resources based at least in part on determining that at least a portion of the downlink control information message is scrambled according to a configured scheduling radio network temporary identifier, wherein determining that the first set of resources and the second set of resources are one of activated or released is based at least in part on determining that at least a portion of the downlink control information message is scrambled according to the configured scheduling radio network temporary identifier.

Aspect 13: The method of any of aspects 1 through 12, further comprising: transmitting, to the base station, a UE capability message indicating that the UE is configured to release two or more sets of resources via a single downlink control information message, wherein receiving the downlink control information message is based at least in part on transmitting the UE capability message.

Aspect 14: The method of any of aspects 1 through 13, wherein the first set of resources and the second set of resources comprise a set of downlink resources associated with a semi-persistent scheduling grant, a set of uplink resources associated with a configured grant, or a combination thereof.

Aspect 15: The method of any of aspects 1 through 14, wherein the downlink control information format of the received downlink control information message is configurable by the base station to perform one of scheduling, activating, or releasing resources on the plurality of component carriers.

Aspect 16: A method for wireless communication at a base station, comprising: identifying a configuration for communications with a UE on a plurality of sets of resources across a plurality of component carriers, the configuration including at least a plurality of sets of resources on multiple component carriers, including at least a first set of resources on a first component carrier of the plurality of component carriers and a second set of resources on a second component carrier of the plurality of component carriers; determining that the first set of resources and the second set of resources are to be one of activated or released; and transmitting, to the UE on the first component carrier, a downlink control information message that comprises a first indication indicating that the first set of resources and the second set of resources are to be the one of activated or released, the downlink control information message comprising a downlink control information format that controls the plurality of sets of resources across the plurality of component carriers.

Aspect 17: The method of aspect 16, wherein the first indication comprises a redundancy version field, a modulation and coding scheme field, a frequency domain resource assignment field, or any combination thereof.

Aspect 18: The method of aspect 17, wherein the first indication comprises a combination of the redundancy version field, the modulation and coding scheme field, and the frequency domain resource assignment field.

Aspect 19: The method of any of aspects 16 through 18, further comprising: transmitting a first new data indicator field of the downlink control information message, wherein the downlink control information message indicates that the first set of resources is the one of activated or released based at least in part on a value of the first new data indicator field.

Aspect 20: The method of aspect 19, wherein the first new data indicator field of the downlink control information message is associated with the first component carrier and the second component carrier, and the downlink control information message indicates that the second set of resources is the one of activated or released based at least in part on the value of the first new data indicator field.

Aspect 21: The method of any of aspects 19 through 20, further comprising: transmitting a second new data indicator field of the downlink control information message, wherein the first new data indicator field of the downlink control information message is associated with the first component carrier, the second new data indicator field of the downlink control information message is associated with the second component carrier, and the downlink control information message indicates that the second set of resources is the one of activated or released based at least in part on the value of the second new data indicator field.

Aspect 22: The method of any of aspects 16 through 21, wherein the downlink control information message indicates that the second set of resources is the one of activated or released further based at least in part on a first value of a first redundancy version field of the transmitted downlink control information message, the first value of the first redundancy version field associated with activation or release of the plurality of sets of resources, and a second value of the first redundancy version field associated with scheduling of the plurality of sets of resources.

Aspect 23: The method of any of aspects 16 through 22, further comprising: transmitting, to the UE, a configuration for the UE to use to interpret the downlink control information message, wherein determining that the first set of resources and the second set of resources are one of activated or released is based at least in part on the transmitted configuration.

Aspect 24: The method of aspect 23, further comprising: transmitting, to the UE, a second indication in the downlink control information message; and determining that the downlink control information message is configurable to activate the plurality of sets of resources based at least in part on the second indication and the configuration for the UE to use to interpret the downlink control information message.

Aspect 25: The method of aspect 24, wherein the second indication in the downlink control information message comprises a value of a carrier indicator field.

Aspect 26: The method of any of aspects 16 through 25, further comprising: determining that the downlink control information message is configured to activate the plurality of sets of resources based at least in part on a control resource set, a search space, or both, on which the downlink control information message was transmitted.

Aspect 27: The method of any of aspects 16 through 26, further comprising: encoding, according to a configured scheduling radio network temporary identifier, at least a portion of the downlink control information message to indicate that the first set of resources and the second set of resources are to be the one of activated or released.

Aspect 28: The method of any of aspects 16 through 27, further comprising: receiving, from the UE, a UE capability message indicating that the UE is configured to release two or more sets of resources via a single downlink control information message, wherein transmitting the downlink control information message is based at least in part on receiving the UE capability message.

Aspect 29: The method of any of aspects 16 through 28, wherein the first set of resources and the second set of resources comprise a set of downlink resources associated with a semi-persistent scheduling grant, a set of uplink resources associated with a configured grant, or a combination thereof.

Aspect 30: The method of any of aspects 16 through 29, wherein the downlink control information format of the received downlink control information message is configurable by the base station to perform one of scheduling, activating, or releasing resources on the plurality of component carriers.

Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication at a base station, comprising a processor; memory coupled with the processor; and instructions stored in the memory and executable by the processor to cause the apparatus to perform a method of any of aspects 16 through 30.

Aspect 35: An apparatus for wireless communication at a base station, comprising at least one means for performing a method of any of aspects 16 through 30.

Aspect 36: A non-transitory computer-readable medium storing code for wireless communication at a base station, the code comprising instructions executable by a processor to perform a method of any of aspects 16 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more processors, and
   memory coupled with the one or more processors;
   the one or more processors configured to cause the apparatus to:
     identify a configuration for communications with a base station on a plurality of sets of resources across a plurality of component carriers, the configuration including a plurality of sets of resources on multiple component carriers, including at least a first set of resources on a first component carrier of the plurality of component carriers and a second set of resources on a second component carrier of the plurality of component carriers;
     receive, from the base station, a downlink control information message on the first component carrier, the downlink control information message comprising a downlink control information format that controls the plurality of sets of resources across the plurality of component carriers based at least in part on at least a portion of the downlink control information message being scrambled according to a configured scheduling radio network temporary identifier; and
     determine that the first set of resources and the second set of resources are one of activated or released based at least in part on a first indication in the downlink control information message and at least the portion of the downlink control information message being scrambled according to the configured scheduling radio network temporary identifier.

2. The apparatus of claim 1, wherein the first indication comprises a redundancy version field, a modulation and coding scheme field, a frequency domain resource assignment field, or any combination thereof.

3. The apparatus of claim 2, wherein the first indication comprises a combination of the redundancy version field, the modulation and coding scheme field, and the frequency domain resource assignment field.

4. The apparatus of claim 1, the one or more processors configured to cause the apparatus to:
   receive a first new data indicator field of the downlink control information message, wherein determining that the first set of resources is the one of activated or released is based at least in part on a value of the first new data indicator field.

5. The apparatus of claim 4, wherein the first new data indicator field of the downlink control information message is associated with the first component carrier and the second component carrier, and determining that the second set of resources is the one of activated or released is based at least in part on the value of the first new data indicator field.

6. The apparatus of claim 4, the one or more processors configured to cause the apparatus to:
   receive a second new data indicator field of the downlink control information message, wherein the first new data indicator field of the downlink control information message is associated with the first component carrier, the second new data indicator field of the downlink control information message is associated with the second component carrier, and determining that the second set of resources is one of activated or released is based at least in part on a value of the second new data indicator field.

7. The apparatus of claim 1, wherein to determine that the first set of resources and the second set of resources are one of activated or released, the one or more processors are configured to cause the apparatus to:
   determine whether a first redundancy version field of the received downlink control information message comprises a first value associated with activation or release of the plurality of sets of resources or a second value associated with scheduling of the plurality of sets of resources.

8. The apparatus of claim 1, the one or more processors configured to cause the apparatus to:
   receive, from the base station, a configuration for the UE to use to interpret the downlink control information message, wherein determining that the first set of resources and the second set of resources are one of activated or released is based at least in part on the received configuration.

9. The apparatus of claim 8, the one or more processors configured to cause the apparatus to:
   identify a second indication in the downlink control information message, wherein the second indication in the downlink control information message comprises a value of a carrier indicator field; and
   determine that the downlink control information message is configurable to activate the plurality of sets of resources based at least in part on the second indication and the configuration for the UE to use to interpret the downlink control information message.

10. The apparatus of claim 1, the one or more processors configured to cause the apparatus to:
determine that the downlink control information message is configured to activate the plurality of sets of resources based at least in part on a control resource set, a search space, or both, on which the downlink control information message was received.

11. The apparatus of claim 1, the one or more processors configured to cause the apparatus to:
transmit, to the base station, a UE capability message indicating that the UE is configured to release two or more sets of resources via a single downlink control information message, wherein receiving the downlink control information message is based at least in part on transmitting the UE capability message.

12. The apparatus of claim 1, wherein the first set of resources and the second set of resources comprise a set of downlink resources associated with a semi-persistent scheduling grant, a set of uplink resources associated with a configured grant, or a combination thereof.

13. The apparatus of claim 1, wherein the downlink control information format of the received downlink control information message is configurable by the base station to perform one of scheduling, activating, or releasing resources on the plurality of component carriers.

14. An apparatus for wireless communication at a base station, comprising:
one or more processors, and
memory coupled with the one or more processors;
the one or more processors configured to cause the apparatus to:
identify a configuration for communications with a user equipment (UE) on a plurality of sets of resources across a plurality of component carriers, the configuration including a plurality of sets of resources on multiple component carriers, including at least a first set of resources on a first component carrier of the plurality of component carriers and a second set of resources on a second component carrier of the plurality of component carriers;
determine that the first set of resources and the second set of resources are to be one of activated or released; and
transmit, to the UE on the first component carrier, a downlink control information message that comprises a first indication indicating that the first set of resources and the second set of resources are to be the one of activated or released based at least in part on at least a portion of the downlink control information message being scrambled according to a configured scheduling radio network temporary identifier, the downlink control information message comprising a downlink control information format that controls the plurality of sets of resources across the plurality of component carriers based at least in part on at least the portion of the downlink control information message being scrambled according to the configured scheduling radio network temporary identifier.

15. The apparatus of claim 14, wherein the first indication comprises a redundancy version field, a modulation and coding scheme field, a frequency domain resource assignment field, or any combination thereof.

16. The apparatus of claim 14, the one or more processors configured to cause the apparatus to:

transmit a first new data indicator field of the downlink control information message, wherein the downlink control information message indicates that the first set of resources is the one of activated or released based at least in part on a value of the first new data indicator field.

17. A method for wireless communication at a user equipment (UE), comprising:
identifying a configuration for communications with a base station on a plurality of sets of resources across a plurality of component carriers, the configuration including multiple resources on multiple component carriers, including a plurality of sets of resources on multiple component carriers, including at least a first set of resources on a first component carrier of the plurality of component carriers and a second set of resources on a second component carrier of the plurality of component carriers;
receiving, from the base station, a downlink control information message on the first component carrier, the downlink control information message comprising a downlink control information format that controls the plurality of sets of resources across the plurality of component carriers based at least in part on at least a portion of the downlink control information message being scrambled according to a configured scheduling radio network temporary identifier; and
determining that the first set of resources and the second set of resources are one of activated or released based at least in part on a first indication in the downlink control information message and at least the portion of the downlink control information message being scrambled according to the configured scheduling radio network temporary identifier.

18. The method of claim 17, wherein the first indication comprises a redundancy version field, a modulation and coding scheme field, a frequency domain resource assignment field, or any combination thereof.

19. The method of claim 18, wherein the first indication comprises a combination of the redundancy version field, the modulation and coding scheme field, and the frequency domain resource assignment field.

20. The method of claim 17, further comprising:
receiving a first new data indicator field of the downlink control information message, wherein determining that the first set of resources is the one of activated or released is based at least in part on a value of the first new data indicator field.

21. The method of claim 20, wherein the first new data indicator field of the downlink control information message is associated with the first component carrier and the second component carrier, and determining that the second set of resources is the one of activated or released is based at least in part on the value of the first new data indicator field.

22. The method of claim 20, further comprising:
receiving a second new data indicator field of the downlink control information message, wherein the first new data indicator field of the downlink control information message is associated with the first component carrier, the second new data indicator field of the downlink control information message is associated with the second component carrier, and determining that the second set of resources is one of activated or released is based at least in part on a value of the second new data indicator field.

23. The method of claim 17, wherein the determining that the first set of resources and the second set of resources are one of activated or released comprise:
- determining whether a first redundancy version field of the received downlink control information message comprises a first value associated with activation or release of the plurality of sets of resources or a second value associated with scheduling of the plurality of sets of resources.

24. The method of claim 17, further comprising:
- receiving, from the base station, a configuration for the UE to use to interpret the downlink control information message, wherein determining that the first set of resources and the second set of resources are one of activated or released is based at least in part on the received configuration.

25. The method of claim 24, further comprising:
- identifying a second indication in the downlink control information message, wherein the second indication in the downlink control information message comprises a value of a carrier indicator field; and
- determining that the downlink control information message is configurable to activate the plurality of sets of resources based at least in part on the second indication and the configuration for the UE to use to interpret the downlink control information message.

26. The method of claim 17, further comprising:
- determining that the downlink control information message is configured to activate the plurality of sets of resources based at least in part on a control resource set, a search space, or both, on which the downlink control information message was received.

27. The method of claim 17, further comprising:
- transmitting, to the base station, a UE capability message indicating that the UE is configured to release two or more sets of resources via a single downlink control information message, wherein receiving the downlink control information message is based at least in part on transmitting the UE capability message.

28. A method for wireless communication at a base station, comprising:
- identifying a configuration for communications with a user equipment (UE) on a plurality of sets of resources across a plurality of component carriers, the configuration including a plurality of sets of resources on multiple component carriers, including at least a first set of resources on a first component carrier of the plurality of component carriers and a second set of resources on a second component carrier of the plurality of component carriers;
- determining that the first set of resources and the second set of resources are to be one of activated or released; and
- transmitting, to the UE on the first component carrier, a downlink control information message that comprises a first indication indicating that the first set of resources and the second set of resources are to be the one of activated or released based at least in part on at least a portion of the downlink control information message being scrambled according to a configured scheduling radio network temporary identifier, the downlink control information message comprising a downlink control information format that controls the plurality of sets of resources across the plurality of component carriers based at least in part on at least the portion of the downlink control information message being scrambled according to the configured scheduling radio network temporary identifier.

* * * * *